US 7,194,010 B2

United States Patent
Beasley et al.

(10) Patent No.: US 7,194,010 B2
(45) Date of Patent: Mar. 20, 2007

(54) WIRELESS BASE STATION TO BASE STATION SYNCHRONIZATION IN A COMMUNICATION SYSTEM, SUCH AS A SYSTEM EMPLOYING A SHORT RANGE FREQUENCY HOPPING OR TIME DIVISION DUPLEX SCHEME

(75) Inventors: James Beasley, Simi Valley, CA (US); Dennis Dombrowski, Moorpark, CA (US); Matthew Kuiken, Thousand Oaks, CA (US); Wade Mergenthal, Camarillo, CA (US); Spencer Stephens, Los Angeles, CA (US)

(73) Assignee: Strix Systems, Inc., Calabasas, CA (US)

( * ) Notice: Subject to any disclaimer, the term of this patent is extended or adjusted under 35 U.S.C. 154(b) by 1048 days.

(21) Appl. No.: 10/139,609

(22) Filed: May 2, 2002

(65) Prior Publication Data

US 2002/0177460 A1    Nov. 28, 2002

Related U.S. Application Data

(63) Continuation-in-part of application No. 10/052,910, filed on Jan. 18, 2002, now Pat. No. 7,016,325, and a continuation-in-part of application No. PCT/US02/01559, filed on Jan. 18, 2002.

(60) Provisional application No. 60/333,844, filed on Nov. 28, 2001, provisional application No. 60/333,885, filed on Nov. 28, 2001, provisional application No. 60/288,296, filed on May 2, 2001, provisional application No. 60/288,294, filed on May 2, 2001.

(51) Int. Cl.
    *A04J 3/06*    (2006.01)
(52) U.S. Cl. ....................... 370/503; 370/282; 370/331

(58) Field of Classification Search ............... 370/331, 370/329, 328, 278, 282, 503; 455/502
See application file for complete search history.

(56) References Cited

U.S. PATENT DOCUMENTS

| | | | |
|---|---|---|---|
| 3,781,803 A | 12/1973 | Shear et al. ................ 375/356 |
| 5,068,916 A | 11/1991 | Harrison et al. .............. 455/39 |
| 5,179,569 A | 1/1993 | Sawyer ....................... 375/133 |
| 5,329,635 A | 7/1994 | Wadin et al. ............... 455/438 |
| 5,355,515 A | 10/1994 | Sicher ........................ 455/438 |
| 5,408,506 A | 4/1995 | Mincher et al. ............ 375/134 |
| 5,495,508 A | 2/1996 | Kaewell, Jr. et al. ....... 375/356 |
| 5,537,685 A | 7/1996 | Matsuno ..................... 455/502 |
| 5,541,979 A | 7/1996 | Leslie et al. ................ 455/436 |
| 5,542,098 A | 7/1996 | Bonta ......................... 455/434 |
| 5,577,025 A | 11/1996 | Skinner et al. ............. 370/209 |
| 5,608,780 A | 3/1997 | Gerszberg et al. .......... 455/436 |
| 5,613,211 A | 3/1997 | Matsuno ..................... 455/502 |
| 5,625,653 A | 4/1997 | Kaewell, Jr. et al. ....... 375/356 |
| 5,722,074 A | 2/1998 | Muszynski et al. ......... 455/442 |
| 5,794,149 A | 8/1998 | Hoo ............................ 455/438 |
| 5,818,814 A | 10/1998 | Testani et al. .............. 370/212 |
| 5,854,981 A | 12/1998 | Wallstedt et al. ........... 455/439 |
| 5,875,179 A | 2/1999 | Tikalsky ..................... 370/315 |
| 5,875,402 A | 2/1999 | Yamawaki .................. 455/502 |
| 5,887,022 A | 3/1999 | Lee et al. .................... 375/132 |
| 5,898,929 A | 4/1999 | Haartsen ..................... 454/462 |
| 5,907,807 A | 5/1999 | Chavez, Jr. et al. ........ 455/436 |
| 5,920,549 A | 7/1999 | Bruckert et al. ............ 370/331 |
| 5,930,297 A | 7/1999 | Kaewell, Jr. et al. ....... 375/260 |
| 5,960,344 A | 9/1999 | Mahany ................... 455/432.2 |
| 6,018,667 A | 1/2000 | Ghosh et al. ............... 455/502 |
| 6,026,297 A | 2/2000 | Haartsen .................. 455/426.1 |
| 6,046,824 A | 4/2000 | Barak ......................... 358/400 |
| 6,061,561 A | 5/2000 | Alanara et al. ........... 455/461.1 |
| 6,078,571 A | 6/2000 | Hall ........................... 370/331 |
| 6,091,936 A | 7/2000 | Chennakeshu et al. .... 455/63.3 |
| 6,097,703 A | 8/2000 | Larsen et al. ............... 370/254 |
| 6,112,100 A | 8/2000 | Ossoinig et al. ............ 455/502 |
| 6,119,005 A | 9/2000 | Smolik ....................... 455/436 |
| 6,119,015 A * | 9/2000 | Eun ............................ 455/502 |
| 6,119,016 A | 9/2000 | Matusevich ................ 455/502 |
| 6,125,138 A | 9/2000 | Kumagai .................... 375/219 |
| 6,125,280 A | 9/2000 | Grandhi et al. ............. 455/446 |
| 6,151,502 A | 11/2000 | Padovani et al. ........... 455/442 |
| 6,175,860 B1 | 1/2001 | Gaucher ..................... 709/208 |

| | | | |
|---|---|---|---|
| 6,178,164 B1 | 1/2001 | Wang et al. | 370/331 |
| 6,185,429 B1 | 2/2001 | Gehrke et al. | 455/502 |
| 6,188,904 B1 | 2/2001 | Marsan | 455/450 |
| 6,192,244 B1 | 2/2001 | Abbadessa | 454/436 |
| 6,195,342 B1 | 2/2001 | Rohani | 370/331 |
| 6,195,551 B1 | 2/2001 | Kim et al. | 455/436 |
| 6,198,920 B1 | 3/2001 | Doviak et al. | 455/426.1 |
| 6,201,962 B1 | 3/2001 | Sturniolo et al. | 455/432.2 |
| 6,201,969 B1 | 3/2001 | Meier | 455/462 |
| 6,212,398 B1 | 4/2001 | Roberts et al. | 455/502 |
| 6,219,347 B1 | 4/2001 | Uchida et al. | 370/347 |
| 6,223,040 B1 | 4/2001 | Dam | 455/447 |
| 6,226,515 B1 | 5/2001 | Pauli et al. | 455/426.1 |
| 6,430,395 B2 | 8/2002 | Arazi et al. | 455/41.2 |
| 6,535,740 B1 | 3/2003 | Kosugi et al. | 455/442 |
| 6,975,582 B1 | 12/2005 | Karabinis et al. | 370/204 |
| 7,020,109 B2 | 3/2006 | Grilli et al. | 370/331 |
| 2002/0035699 A1 | 3/2002 | Crosbie | 726/12 |
| 2002/0075941 A1 | 6/2002 | Souissi et al. | 375/133 |
| 2002/0085719 A1 | 7/2002 | Crosbie | |
| 2002/0122396 A1 | 9/2002 | Terasawa | 370/331 |

FOREIGN PATENT DOCUMENTS

| | | |
|---|---|---|
| EP | 0 639 036 A2 | 2/1995 |
| EP | 1071305 A2 | 1/2001 |
| WO | WO 97/32445 A1 | 9/1997 |
| WO | WO 98/39936 A2 | 9/1998 |
| WO | WO 98/56140 A2 | 12/1998 |
| WO | WO 99/07105 A2 | 2/1999 |
| WO | WO 00/27142 A1 | 5/2000 |
| WO | WO 00/69186 A1 | 11/2000 |
| WO | WO 01/01717 A1 | 1/2001 |
| WO | WO 01/03327 A2 | 1/2001 |
| WO | WO 01/03370 A2 | 1/2001 |
| WO | WO 01/03371 A2 | 1/2001 |
| WO | WO 01/41348 A2 | 6/2001 |
| WO | WO 01/78246 A1 | 10/2001 |
| WO | WO 02/03626 A2 | 1/2002 |
| WO | WO 02/25838 A1 | 3/2002 |
| WO | WO 02/25967 A1 | 3/2002 |
| WO | WO 02/41587 A2 | 5/2002 |

OTHER PUBLICATIONS

Corson et al., Temporally-Ordered Routing Algorithm (TORA) Version 1 Functional Specification (Internal Draft, Nov. 15, 1997 pp. 1-20) http://wwww.ics.uci.edu/~atm/adhoc/paper-collection/corson-draft-ieft-manet-tora-spec-00.txt (Nov. 4, 2002), University of California, Irvine.

Schiller, J., "Mobile Communications," pp. 84-112, Addison-Wesley, 2000.

Albrecht, M. et al., "IP Services Over Bluetooth: Leading the Way to a New Mobility," Local Computer Networks LCN '99, Conference on Lowell, MA, USA Oct. 18-20, 1999, Los Alamitos, CA USA, IEEE Computer Society, pp. 2-11, XP010358529, 1999.

Bluetooth Specification Version 1.0B, "10. Channel Control," XP002937254, pp. 95-126, Nov. 29, 1999.

Hartson, J., "Bluetooth—The universal radio interface for *ad hoc*, wireless connectivity," Ericsson Review No. 3, XP-000783249, pp. 110-117, Ericsson, Stockholm, SE, 1998.

U.S. Appl. No. 10/052,910, filed Jan. 18, 2002, Beasley et al.
U.S. Appl. No. 10/139,130, filed May 2, 2002, Beasley et al.

Alvarion Ltd., "Alvarion Products," http://www.alvarion.com/RunTime/Products_2000.asp?fuf=1&PrintVersion=1 (Nov. 19, 2002), 1 page, Tel Aviv, Israel.

Alvarion Ltd., "BreezeLINK Full Duplex Wireless E1/T1 Modem. Extending your reach," http://www.alvarion.com/RunTime/Materials/PDFFiles/breezelink_brochure.pdf (Nov. 5, 2002), 2 pages, Tel Aviv, Israel, 2001.

Alvarion Ltd., "BreezeLINK" http://www.alvarion.com/RunTime/Products_2015.asp?tNodeParam=19&fuf=1&PrintVersion=1 (Nov. 5, 2002), 2 pages, Tel Aviv, Israel.

Alvarion Ltd., "BreezeNET PRO.11 Indoor," http://www.alvarion.com/RunTime/Products_2020.asp?tNodeParam=14&fuf=1&PrintVersion=1 (Nov. 5, 2002), 2 pages, Tel Aviv, Israel.

Alvarion Ltd., "BreezeNET PRO.11 Outdoor," http://www.alvarion.com/RunTime/Products_2020.asp?tNodeParam=13&fuf=1&PrintVersion=1 (Nov. 5, 2002), 2 pages, Tel Aviv, Israel.

Alvarion Ltd., "BreezeNET PRO.11 Wireless LAN. Hopping the Spectrum," http://www.alvarion.com/RunTime/Materials/PDF-Files/BreezeNET_%20PRO11.pdf (Nov. 5, 2002), 2 pages, Tel Aviv, Israel, 2001.

Alvarion Ltd., "Wireless LAN," http://www.alvarion.com/RunTime/Products_2010.asp?tNodeParam=16&fuf=1&PrintVersion=1 (Nov. 13, 2002), 2 pages, Tel Aviv, Israel.

Alvarion Ltd., BreezeACCESS II Base Station Equipment, http://www.alvarion.com/RunTime/Products_2030.asp?tNodeParam=16&fuf=1&PrintVersion=1 (Nov. 19, 2002), 3 pages, Tel Aviv, Israel.

Alvarion Ltd., BreezeACCESS MMDS Base Station Equipment, http://www.alvarion.com/RunTime/Products_2030.asp?tNodeParam=19&fuf=1&PrintVersion=1 (Nov. 19, 2002), 2 pages, Tel Aviv, Israel.

Alvarion Ltd., BreezeACCESS OFDM Base Station Equipment, http://www.alvarion.com/RunTime/Products_2030.asp?tNodeParam=37&fuf=1&PrintVersion=1 (Nov. 19, 2002), 1 page, Tel Aviv, Israel.

Alvarion Ltd., BreezeACCESS XL Base Station Equipment, http://www.alvarion.com/RunTime/Products_2030.asp?tNodeParam=17&fuf=1&PrintVersion=1 (Nov. 19, 2002), 1 page, Tel Aviv, Israel.

Alvarion Ltd., BreezeLINK Technical Specifications, http://www.alvarion.com/RunTime/Products_2015.asp?fuf=1&type=item&htmlName=BRL_121_2048.htm (Nov. 5, 2002), 4 pages, Tel Aviv, Israel.

Alvarion, Ltd., "Secure Broadband Wireless Network With BreezeACCESS & BreezeNET PRO.11," http://www.alvarion.com/RunTime/Materials/PDFFiles/WP_BWAsecurity.pdf (Nov. 5, 2002), 6 pages, Tel Aviv, Israel, 2001.

ARM Ltd., "Atmel Announces 802.11 Media Access Controller for Wireless Applications," http://www.arm.com/news.nsf/html/4MTDF9?OpenDocument&style=Press_Room (Nov. 4, 2002), 2 pages, San Jose, California, Mar. 22, 1999.

Arthur H.M. Ross, Ph.D., Limited, "Handoff," http://www.amug.org/~ahmrphd/Handoff.html, Jun. 28, 1996, 5 pages.

Baatz, S. et al., "Handoff Support for Mobility with IP over Bluetooth," Proceedings of the 25th Annual Conference on Local Computer Networks (LCN '00), pp. 143-154, Tampa, Florida, Nov. 2000, IEEE, Inc., Los Alamitos, California.

Bluesocket Inc., "Bluesocket BluePaper: Overview of Wireless Local Area Networking," http://www.bluesocket.com/products/bluepaper.html (Nov. 20, 2002), 8 pages, Burlington, Massachusetts, 2002.

Bluesocket Inc., "Bluesocket Specifications," http://www.bluesocket.com/solutions/specs.html (Nov. 20, 2002), 3 pages, Burlington, Massachusetts, 2002.

Bluesocket Inc., "The Bluesocket Wireless Gateway Family," http://www.bluesocket.com/solutions/family.html (Nov. 20, 2002), 2 pages, Burlington, Massachusetts, 2002.

BreezeCOM Press Release, "BreezeCOM Announces Availability of MMDS Products in North America. Flexible Solution is Scalable and Easy to Install," 1 page, Atlanta, Georgia, Jun. 6, 2000.

Commil, Ltd., "Commil Ltd. Raised $7M from Leading Israeli VCs," p. 10, in "News," http://www.commil.com.html.news.htm (Nov. 18, 2002), 13 pages, Petah Tikva, Israel, Jan. 3, 2001.

Commil, Ltd., "Commil's Technology," http://www.commil.com/html/technology.htm (Nov. 18, 2002), 1 page, Petah Tikva, Israel.

ECI Telecom Ltd., Company Profile, http://www.ecitele.com/company/company_profile.asp (Nov. 5, 2002), 2 pages.

EDN Magazine, EDN Access, "RFID tags shrink and gain flexibility," SCS Corporation, San Diego, California, p. 16, in "Hot 100 Products of 1997: North America (1-50)," http://www.e-insite.net/ednmag/archives/1997/120497/25cs-01.htm (Nov. 5, 2002), 18 pages, Cahners Publishing Company, 1997.

Hlasny, D., "Synchronization of Bluetooth Access points," Version 1.0, Sharp Laboratories of America, 5 pages, Camas, Washington, Nov. 29, 2000.

InnoWave ECI Wireless Systems Ltd., "About InnoWave," http://www.innowave-ws.com/asp/sub.asp?sec=3&sub=5 (Nov. 5, 2002), 2 pages, Petach Tikva, Israel, 2001.

InnoWave ECI Wireless Systems Ltd., "eMGW, Your Wireless DSL Alternative for Data & Telephony Services," http://www.innowave-ws.com/files/pdf/eMGWbrochure.pdf (Nov. 5, 2002), 2 pages, Petach Tikva, Israel.

InnoWave ECI Wireless Systems Ltd., "enhanced MultiGain Wireless (eMGW)," http://www.innowave-ws.com/asp/sub.asp?sec=49&sub=314 (Nov. 5, 2002), 2 pages, Petach Tikva, Israel.

InnoWave ECI Wireless Systems Ltd., "Fixed Wireless Access—It's All We Do and We Do it All," http://www.innowave-ws.com/files/pdf/Stand%20Guide%200402.pdf (Nov. 5, 2002), 2 pages, Petach Tikva, Israel, 2001.

InnoWave ECI Wireless Systems Ltd., "MGW, MultiGain Wireless, Wireless Voice and Data for Your Residential Users," http://www.innowave-ws.com/files/pdf/MGWbrochure.pdf (Nov. 5, 2002), 2 pages, Petach Tikva, Israel.

InnoWave ECI Wireless Systems Ltd., "MultiGain Wireless (MGW)," http://www.innowave-ws.com/asp/sub.asp?sec=49&sub=312 (Nov. 5, 2002), 2 pages, Petach Tikva, Israel.

Katz, R., "CS 294-7: Cellular Telephony," CS Division, pp. 1-25, University of California, Berkeley, 1996.

Kvaser AB, WAVEcan Product Brochure, http://www.kvaser.com/global/pdfdocs/products/wavecan.pdf, 2 pages, Mölndal, Sweden, Nov. 2001.

Li, J. et al., "Channel Carrying: A Novel Handoff Scheme for Mobile Cellular Networks," 8 pages, IEEE, Inc., Los Alamitos, California, 1997.

Lucent Technologies, "AT&T and Digital Ocean to develop wireless LAN controller chip," http://www.lucent.com/press/0495/950412.nsa.html (Nov. 4, 2002), 2 pages, Utrecht, The Netherlands, Apr. 12, 1995.

Meihofer, E., "The performance of Bluetooth in a densely packed environment," Bluetooth Developers Conference, Advanced Technology & Applications Lab, Motorola, Inc., 19 pages, Dec. 4-7, 2000.

Park, V.D. and Corson, M.S., "Temporally-Ordered Routing Algorithm (TORA) Version 1 Functional Specification (Internet Draft)," http://www.ics.uci.edu/~atm/adhoc/paper-collection/corson-draft-ietf-manet-tora-spec-00.txt (Nov. 4, 2002), pp. 1-20, University of California, Irvine, Nov. 15, 1997.

Sangal, R., "Wireless Local Area Networks," http://www.ent.ohiou.edu/~sangal/lan.html (Nov. 4, 2002), 3 pages, Ohio University, Athens, Ohio.

Toloo, M. and Mouftah, H. T., "A Combinatorial Approach to the Analysis of Channel Allocation in Personal Communication Systems," Sixth IEEE International Symposium on Personal, Indoor, and Mobile Radio Communications, pp. 572-576, Totonto, Canada, IEEE, Inc., Los Alamitos, California, 1995.

Toloo, M. and Mouftah, H. T., "Analysis of the Handover Issue in Mobile Personal Communication Systems Using N-Dimensional Space," 1995 Canadian Conference on Electrical and Computer Engineering, Sep. 5-8, 1995, Montreal, Canada, "Conference Proceedings—Engineering in the Global Village," vol. 1, edited by Francois Gagnon, pp. 547-550, IEEE, Inc., Los Alamitos, California, 1995.

Toloo, M. and Mouftah, H. T., "Speed Considerations and Handover Mechanisms in Mobile Personal Communication Systems," Sixth IEEE International Symposium on Personal, Indoor, and Mobile Radio Communications, Toronto, Canada, pp. 841-845, IEEE, Inc., Los Alamitos, California, 1995.

Toloo, M. and Mouftah, H. T., "Traffic Characteristics Evaluation in Personal Communication Systems with Bernoulli User Sources," Proceedings of the International Conference on Parallel and Distributed Processing Techniques and Applications (PDPTA'95), Athens, Georgia, pp. 857-861, Nov. 1995.

Valkó, A., "Cellular IP—A New Approach to Internet Host Mobility," http://www.acm.org/sigcomm/ccr/archive/1999/jan99/ccr-9901-valko.pdf (Nov. 18, 2002), ACM Computer Communication Review, vol. 29, No. 1, pp. 50-65, Association for Computing Machinery, Special Interest Group on Data Communications, Jan. 1999.

Wright, M., "Home-automation networks mature while the PC industry chases a new home LAN," http://www.e-insite.net/ednmag/archives/1998/060498/12df_02.htm (Nov. 5, 2002), 8 pages, EDN Magazine, EDN Access, Cahners Business Information, Jun. 4, 1998.

\* cited by examiner

*Primary Examiner*—John Pezzlo
(74) *Attorney, Agent, or Firm*—Perkins Coie LLP

(57) ABSTRACT

In a network, a method is disclosed for wirelessly exchanging communications with at least one mobile unit. The network includes first and second base stations units coupled to the network, and may include a system controller. The method includes: receiving a communication signal from the second base station unit, wherein the first and second base station units are configured to employ a wireless communications protocol, and wherein the wireless communications protocol does not provide for handoff of communications links between base station units; at the first base station unit, determining if the second base station unit has been synchronized based on the communication signal; at the first base station unit, if the second base station unit is synchronized, then synchronizing an internal clock based on the synchronized second base station, wherein the synchronizing is performed without assistance from a system controller.

54 Claims, 21 Drawing Sheets

Synchronization Server Record

| Bluetooth device address ("BD Addr") | <unique 48 bit address> | 1702 |
| --- | --- | --- |
| Neighbor's sync master | <predetermined BD Addr> | 1704 |
| Wave Number | <integer> | 1706 |
| Transmit Slot | <integer> | 1708 |
| System Controller Address | <IP Address> | 1710 |
| BSU's IP Address | <local IP Address> | 1712 |
| Initialization Time | <date, time> | 1714 |
| Re-synchronization Time | <date, time> | 1716 |
| Record Expiration | <date, time> | 1718 |

Neighbor List Record (including client synchronization information)

| Neighbor's Bluetooth device address ("BD Addr") | <unique 48 bit address> | 1702 |
| --- | --- | --- |
| Wave Number | <integer> | 1706 |
| Transmit Slot | <integer> | 1708 |
| Neighbor's IP Address | <local IP Address> | 1712 |
| Initialization Time | <date, time> | 1714 |
| Re-synchronization Time | <date, time> | 1716 |
| Record Expiration | <date, time> | 1718 |

WIRELESS BASE STATION TO BASE STATION SYNCHRONIZATION IN A COMMUNICATION SYSTEM, SUCH AS A SYSTEM EMPLOYING A SHORT RANGE FREQUENCY HOPPING OR TIME DIVISION DUPLEX SCHEME

CROSS-REFERENCE TO RELATED APPLICATION(S)

This application claims the benefit of U.S. Provisional Patent Application Nos. 60/288,296 and No. 60/288,294 both filed May 2, 2001; and No. 60/333,844 and No. 60/333,885, both filed Nov. 28, 2001; and this application is a continuation-in-part of U.S. patent application No. 10/052,910 now U.S. Pat. No. 7,016,325 and PCT Application No. US02/01559, both filed Jan. 18, 2002.

BACKGROUND

The disclosed embodiments relate to wireless systems and networks.

Cellular mobile telephony provides voice and data links between users of mobile devices and fixed devices on a network. It gives users mobility without regard to how they are actually connected to the network. This is done by providing access points or base station units that can hand off the connections of mobile devices without interruption of the service. 2G (second generation) digital mobile phone service and AMPS (analog mobile phone service) are examples of such telephone networks.

Many limitations exist with such telephony networks. For example, while cellular mobile telephony networks generally provide service over large areas, such networks have limited capacity for the number of user devices that can be connected within the area covered by each BSU.

The bandwidth provided to users of this service is generally considered low bandwidth or "narrow-band access." Thus, large data applications, such as transferring of large data files, cannot be effectively performed using such networks.

Providers of this service must acquire rights to use licensed radio spectra, often at high investment costs. Thus, employing such networks can be quite expensive for many applications or users.

This type of service is often unavailable or unreliable in certain areas, such as office buildings, convention centers, and train stations, due to physical properties of these areas and/or due to the density of users seeking access to the service.

The Personal Communications Network ("PCN") provides similar features to users of mobile devices, including voice and data links to a network, while providing mobility. PCN has a user model similar to that for cellular mobile telephony, so user behavior for one can be carried over to the other. PCN does not have some of the same limitations as cellular telephony. It offers wider bandwidth, or "broadband access," and can provide greater availability with higher reliability in those particular areas that cellular telephony cannot. The RF spectra used by PCN is unlicensed, and no special access rights are required.

PCN uses wireless networking technology, including IEEE 802.11 and 802.11b, which use direct-sequence spread spectrum, and Bluetooth, which uses frequency-hopping spread spectrum. Importantly, however, the Bluetooth wireless standard does not support movement from one area of coverage or "cell" to another.

Currently, the most well-known attempt to provide features that PCN offers in a mobile environment is referred to as 3G-(third generation) wireless. 3G-wireless, however, is constrained by factors that do not constrain PCN implementations. These include heavy investment for the acquisition of spectrum usage rights.

The above wireless technologies require knowledge of which base stations in a network have coverage overlap with other, neighboring base stations within the network. Such overlap is a prerequisite for base station to base station handoff occurring without links getting dropped. Each base station is typically given the knowledge of base stations to which they can hand off. One example of this is the GSM system, in which each base station is under the control of a base station controller. See, "Mobile Communications," Jochen Schiller, pp. 84–112 (Addison-Wesley, 2000). In the GSM system, the base station controllers and the devices that coordinate them (mobile services switching center) are what decide when and where to hand off. A network can have a potentially large number of base stations, so it can require significant time and effort to inform each base station about which other base stations can receive handoffs from it.

Overall, there is a need for a wireless networking system that solves the above problems while supplying the above benefits, as well as providing other advantages.

BRIEF DESCRIPTION OF THE DRAWINGS

FIG. 17A is a data diagram illustrating a neighbor list record.

FIG. 17B is a data diagram illustrating a synchronization server record.

Figure 1:
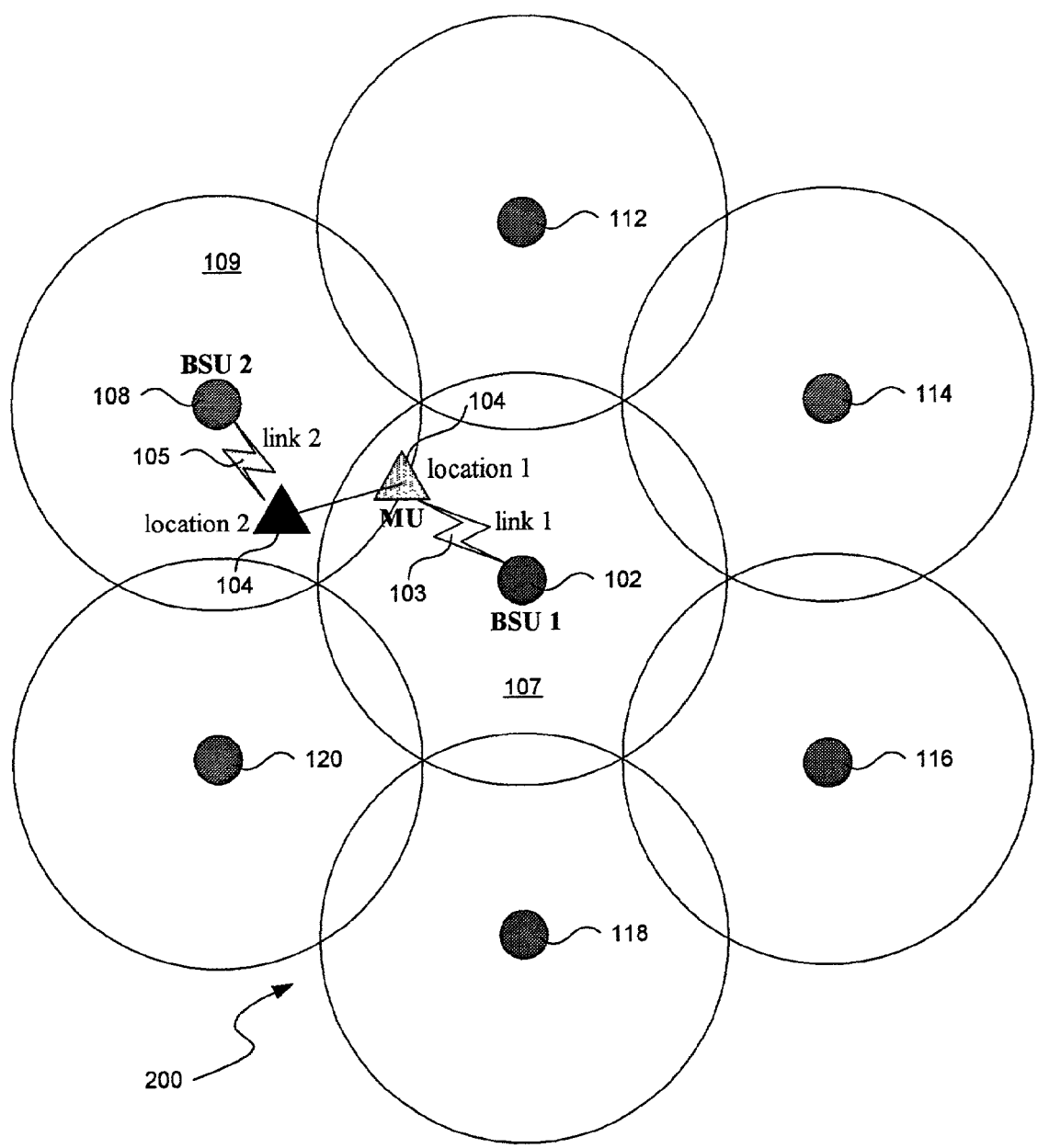
FIG. 1 is a schematic drawing showing a handoff of a mobile user device from one base station unit to a neighboring base station unit under one embodiment of the invention.

In the drawings, the same reference numbers identify identical or substantially similar elements or acts. To easily identify the discussion of any particular element or act, the most significant digit or digits in a reference number refer to the Figure number in which that element is first introduced (e.g., element 204 is first introduced and discussed with respect to FIG. 2).

Note: the headings provided herein are for convenience and do not necessarily affect the scope or interpretation of the invention.

DETAILED DESCRIPTION

Embodiments of the invention, described below, permit network access points or base station units ("BSU") within a cellular network to synchronize communications. Via higher than normal operational RF power, and having RF controllers convert transmit slots into receive slots, wireless system base stations' transmission slot edges are time-aligned, thereby reducing data throughput loss due to channel collisions. Synchronization initialization propagates outward, autonomously, from an origin base station to neighboring base stations to form base station synchronization relationships. Thereafter, synchronization is performed periodically among the base stations according to the formed base station synchronization relationships.

Adjacent base stations are referred to here as "neighbors," "neighboring base stations," or "neighbor BSUs." For the sake of clarity, the term "neighbor BSU" is defined here as: a relationship between one BSU and nearby BSUs; when a BSU is near enough to a second BSU such that a mobile unit ("MU") linked to the second BSU can be handed off to the first BSU, then the first BSU is a neighbor BSU with respect to the second BSU. An "owner" refers to the base station that currently links an MU to a network; thus, a "neighbor" also refers to a different base station monitoring its own link quality with that MU on behalf of its owner.

The inventors found that prior systems provide for base station unit synchronization. However, such prior systems generally fall into one of two groups. The first group uses complex communication protocols, such as codivision multiple access ("CDMA") whereby pilot signals or other communication overheard in such protocols facilitate synchronization. Examples of such systems in this first group may be found in U.S. Pat. Nos. 6,219,347, 6,212,398, 6,119,016, 6,018,667 and 5,875,402.

The second group of systems employ the use of mobile units to synchronize base stations, such as: establishing a priority or rank between base stations units or provide a sync signal to mobile units (e.g., U.S. Pat. No. 5,613,211); mobile units becoming synchronized with a network and providing such synchronization information to base stations (e.g., U.S. Pat. Nos. 5,898,929 and 5,818,814); analyzing traffic with mobile units or others from adjacent base stations (e.g., U.S. Pat. No. 6,112,100); sending special requests to a mobile unit for synchronization (e.g., U.S. Pat. No. 6,185,429); and, adding functionality to mobile unit to permit it to initiate synchronization (e.g., U.S. Pat. No. 5,625,653). Certain other prior art systems apparently employ specialized wired networks, such as circulating a data structure between base stations to permit synchronization (e.g., U.S. Pat. No. 5,068,916), and employing a wired computer LAN (e.g., U.S. Pat. No. 5,408,506, which provides a interesting summary of single- and multiple-master LAN systems, beginning in column 2). No prior system is believed to permit base station units to automatically and autonomously synchronize with each other in a relatively simple communication system employing a seed base station unit that propagates synchronization outwardly therefrom.

Described below first is a suitable system in which aspects of the invention may operate. Second, slot patterns and allocation among radios in a base station with slot patterns employed by a mobile unit are discussed. Third, a method of modifying slot usage is provided. Fourth, a method of increasing throughput by aligning slot edges and details on one embodiment for synchronizing base stations are provided. Fifth, software and functionality details are provided. Finally, alternative embodiments are presented.

Aspects of the invention are described in detail below with respect to the Bluetooth specification. Bluetooth refers to a specification designed to standardize wireless transmission between a wide variety of devices, such as personal computers ("PCs"), cordless telephones, headsets, printers, personal digital assistants ("PDAs"), etc. Bluetooth acts as a "virtual cable," whereby a computer can automatically use a mobile telecommunications device (such as a cell phone) to send data wirelessly, such as exchange e-mail, transmit data to a fax machine, etc. Bluetooth operates in the unlicensed 2.4 GHz spectrum using frequency-hopping spread spectrum, where data packets are spread across the available spectrum at a nominal rate of 1,600 hops per second to lessen interference and fading. According to the Bluetooth specification, Bluetooth devices operate their transmitters at one of three different maximum antenna power levels, i.e., 1 mW, 2.5 mW and 100 mW. The nominal link range is 10 meters, and the gross data rate is 1 Mbps, although increases may be possible. Bluetooth can support both synchronous connection oriented ("SCO") links for voice and asynchronous connectionless links ("ACL") for packet data. Details on Bluetooth may be found at http://www.bluetooth.com, "Bluetooth Revealed," Miller & Bisdikian, Prentice Hall PTR, 2001, and "Bluetooth Demystified," Muller, McGraw-Hill, 2001, and in particular, "Specification of the Bluetooth System," version 1.1: http://www.bluetooth.com/developer/specification/specification.asp.

The following description provides specific details for a thorough understanding of, and enabling description for, embodiments of the invention. However, one skilled in the art will understand that the invention may be practiced without many of these details. In other instances, well-known structures and functions have not been shown or described in detail to avoid unnecessarily obscuring the description of the embodiments of the invention.

Suitable System

As introduced above, the Bluetooth specification defines a protocol for device-to-device and device-to-network communication in a small area. The size of the area is determined by the maximum range over which these devices can communicate and is a function of their radio performance. Communication is not possible if an MU is located outside the maximum range. When such devices communicate, they first establish a link and then maintain that link for the duration of their communication. If the link is interrupted for any reason, then communication is also interrupted.

FIG. 1 shows a device-to-network link 103 shown as "link 1." Here, an MU, or mobile unit 104, represents the wireless mobile device. An access point, or picocellular system node, shown as a BSU, or base station unit 102, provides an interface to a network (not shown in FIG. 1). The terms "mobile unit" and "MU" are used interchangeably herein, as are "base station unit" and "BSU." A picocellular system node typically refers to a wireless base station with extremely low power designed to cover an extremely small area, such as one floor of an office building. Indeed, short range wireless communication as described herein generally refers to an effective range of 500 meters or less (and with Bluetooth, often less than 100 meters) although some systems may reach up to 1 kilometer depending upon the wireless transmission protocol. Base station units described herein are generally fixed relative to a given location. The location may be any stationary building or geographic space (such as a parking lot or park). Alternatively, the BSU may be fixed relative to a movable object such as a vehicle (e.g., train or plane).

A large circle 107 represents the maximum range of communication between these two devices at a given transmission power class—the "domain" of the BSU. While the maximum range limits the coverage of a single BSU, a Pocket Mobility Network ("PMN") system employs multiple distributed BSUs to cover a large region. In general, a cellular communications network typically consists of a collection of base stations, where the base stations provide wireless access points for mobile users to obtain a communication link to a wide range of information and communication services. Each base station is set to reside in one stationary "cell." The cells have some geographical overlap and collectively provide coverage to a particular area, typically encompassing many cells.

An important feature of a cellular communications network is that mobile units can "roam" from communicating with one base station to another adjacent base station within the system and not experience any disruption of the communication link while doing this. When a mobile user roams from one base station to another, a procedure called "handoff" is performed, where the link is actually transferred from the currently connected base station to a neighboring base station. To ensure the best performance, the handoff process is desired to be as fast and efficient as possible with little or no loss in data. In addition, data throughput is desired to be as high as possible. Described in detail herein are methods for synchronizing base stations such that system data throughput and handoff efficiency are optimized.

In FIG. 1, a collection of access points, or BSUs 102, 108 and 112–120, are all able to establish a link with the MU 104 and provide access to the network. The large circles or cells around each BSU illustrate the operating coverage or domain of each BSU (e.g., circles 107 and 109 are associated with BSUs 102 and 108, respectively). Typical BSU placement allows for overlapping areas of coverage. The BSU that actually participates in a link is generally the one that has the strongest signal at the MU (but other factors may affect this, as well). When that signal weakens, such as when the MU moves away from that BSU with which it is communicating and toward an adjacent or neighboring BSU, a handoff may occur. A handoff of the link may be made from the BSU 102 to the neighbor BSU 108, creating a new link 105 (link 2).

When the MU 104 first establishes a link with a BSU, it does so using the same procedures that it might use to communicate with any other Bluetooth device. To the MU, the BSU behaves exactly like any other Bluetooth device that operates in conformance with the Bluetooth specification. Thus, it does so while not requiring any modification to MU devices that comply with the Bluetooth specification. In the example of FIG. 1, after establishing link 1, the MU 104 can continue to communicate with the network through the BSU 102 for as long as necessary, as long as it stays within the domain of the BSU. While aspects of the invention are described herein as employing the Bluetooth protocol, those skilled in the relevant art will recognize that aspects of the invention are equally applicable with other communication protocols and standards, including IEEE 802.11, Home RF, etc.

When the MU 104 moves, it may move within the range of another BSU (e.g. shown in FIG. 1 as the MU moving from location 1 near the first BSU 102 to location 2 near the neighbor BSU 108, where the MU establishes a new link with the neighbor BSU 108). If the MU moves beyond the range of the first BSU 102, the link with the neighbor BSU 108 can be used to maintain uninterrupted communication with the network, provided that a new link is established before the link with the first BSU is lost. In other words, the MU 104 must establish a link 2 with the BSU 108 in a new domain 109.

Figures 2A, 2B:
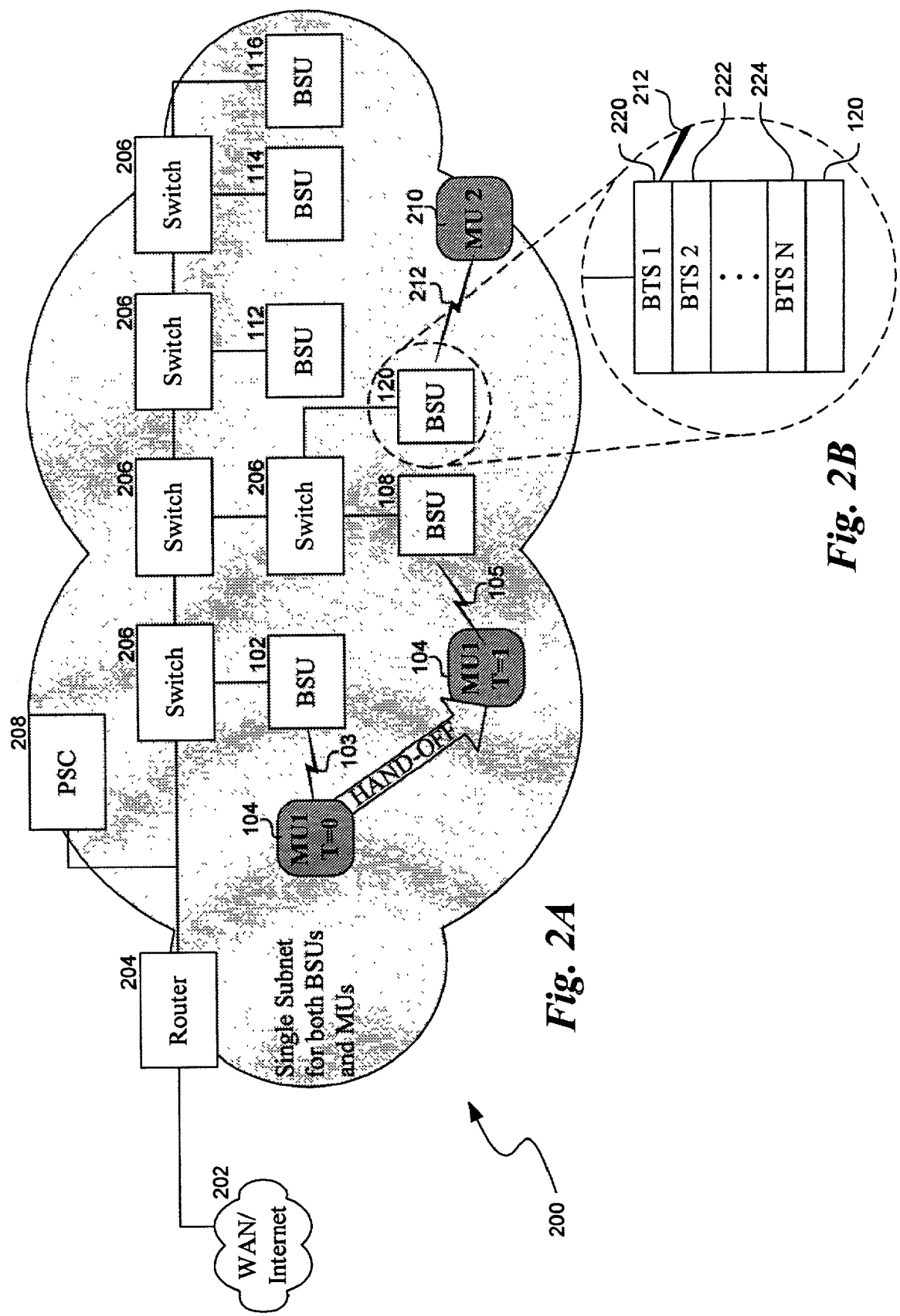
FIG. 2A is a block diagram illustrating a single subnet Internet Protocol ("IP") architecture where all base station units and mobile units are assigned addresses within this single subnet.
FIG. 2B is an enlarged block diagram of one of the base station units shown in FIG. 2A.

Under one embodiment, the PMN is designed in a fashion similar to the General Packet Radio Service ("GPRS") system architecture and thus, may use much of the same terminology. The PMN includes multiple BSUs and a PMN system controller ("PSC") to manage the BSUs. As shown in FIG. 2B, each BSU may in turn include one or more base transceiver stations ("BTS"), where each BTS includes Bluetooth hardware and associated software that runs below a Host Controller Interface ("HCI"). A backbone controller to link the BSUs and controller with RF or other wireless links, instead of cabling, may be employed. A network service provider may supply various devices to provide connectivity to networks beyond the immediate premises (or other coverage area) as part of a complete service.

Each BSU may include a Bluetooth RF module or radio, a microprocessor (picocell or baseband controller) with memory (e.g., RAM) and an antenna. The BSUs may mount in a convenient location, such as on a ceiling or a wall, and provide radio coverage within an approximate 10-meter radius. Each BSU may run both Asynchronous Connectionless Links ("ACL") and Synchronous Connection Oriented ("SCO") services for data and voice connectivity and a control stack, and a voice-over IP software module. Each BSU is based on available Bluetooth chip modules and available Bluetooth protocol stacks.

The BSUs may each be directly connected to the system controller by using appropriate cabling, such as Category 5 cabling, or may be connected through an existing wired or wireless network. Such cabling is necessary to provide not only a signal path therebetween, but may also supply power to the BSU. Alternatively, a link with the base station controller may be accomplished via wireless techniques. Wiring may be required, however, to provide power to the BSUs.

The PMN may include multiple interfaces (such as Ethernet interfaces), a processor module, a switching module, and interfaces for channelized voice and LAN/WAN or other connectivity (including packetized voice). The PMN software modules may include a voice stack, a data stack, and a control stack. The control stack handles mobile unit tracking and handoffs, user management, and session management.

A network service provider providing the PMN may also include a channelized (standard) private branch exchange ("PBX"), a voice over IP PBX switch, a direct connection to the public switched telephone network ("PSTN"), a router (for data, voice over IP, or both), a server (for providing various application), a cache, etc. Prepackaged applications for vertical markets, such as hospitals, theme parks, malls, airports, for enterprises and service providers, for private networks in a public space, etc., may also be provided with the PMN.

An example of a PMN is shown in FIGS. 2A and 2B. Referring to FIG. 2A, the base station units are coupled to the Internet or wide area network ("WAN") 202 by way of an edge router 204 and switches 206. As shown in FIG. 2A, each BSU is coupled to one switch. Each BSU acts as a bridge between a wired LAN that includes the BSUs, switches 206 and router 204, and the wireless links to the mobile units (e.g., wireless links 103 and 212 to mobile units 104 and 210). The LAN is implemented using Ethernet or an alternative technology. A PMN system controller ("PSC") 208 or "system controller" is coupled to the network 200 or subnet and acts as a systems data communication gateway providing mediation between the PMN and the Internet or WAN 202. The system controller is effectively a collection of functions that may reside or run on one or more computers, such a one or more server computers. While the Internet or WAN 202 are shown, the subnet may be coupled with other networks, such as a LAN, the PSTN, or public land mobile network ("PLMN"). The system controller switches voice and data communications to the appropriate wired or wireless network to which the subnet is coupled.

As shown in FIG. 2B, the BSU 120 includes several BTSs. Specifically, the BSU 120 includes BTS 1 220, BTS 2 222 through BTS N 224. Of course, other BSUs likewise may include one or more BTSs. While each BTS is shown in a single block (such as separate radio cards in a single housing forming a BSU), each BTS may be incorporated within a separate housing and connected together to form a single BSU.

The system controller and BSUs may employ the Bluetooth LAN access profile ("LAP"). The LAP uses established networking protocols to enable a computing device or MU to obtain access to a data network. Use of the LAP is analogous to directly connecting to a data network such as via Ethernet. Further details regarding LAP may be found in the Bluetooth protocol noted above.

The network 200 forms the entire domain of the PMN, which is the domain over which a mobile unit can be handed off. If a mobile unit can be handed off between BSUs, then those BSUs are on the same PMN. The router 204 that connects the PMN or subnet both logically and physically to the rest of a corporate network (e.g., WAN 202) is the first router in the data path for MUs communicating with nodes outside the subnet and may be running network address translation ("NAT").

NAT refers to an Internet standard that enables a local area network to use one set of IP addresses for Intranet traffic and a second set of addresses for external traffic. This allows a company to shield internal addresses from the public Internet. This would allow the network 200 to connect to the Internet 202 while not all hosts within the network have globally unique IP addresses. Thus, NAT enables the network 200 to use nonregistered IP addresses to connect to the Internet. The NAT-enabled router translates internal local addresses to globally unique IP addresses before sending packets outside of the network 200. There exist many ways to implement NAT.

Most models of cellular-like systems from General Packet Radio Service ("GPRS") use a non-routed Radio Access Network ("RAN"). In other words, the IP address of the mobile unit is not used to locate the mobile unit once the packet is inside a gateway router. In GPRS, the serving GPRS support node ("SGSN") maintains a mapping of IP addresses to telephone numbers to keep track of locations of mobile units by telephone numbers. As a mobile unit is handed off from one BSC to another, the SGSN tables are updated.

Figure 3:
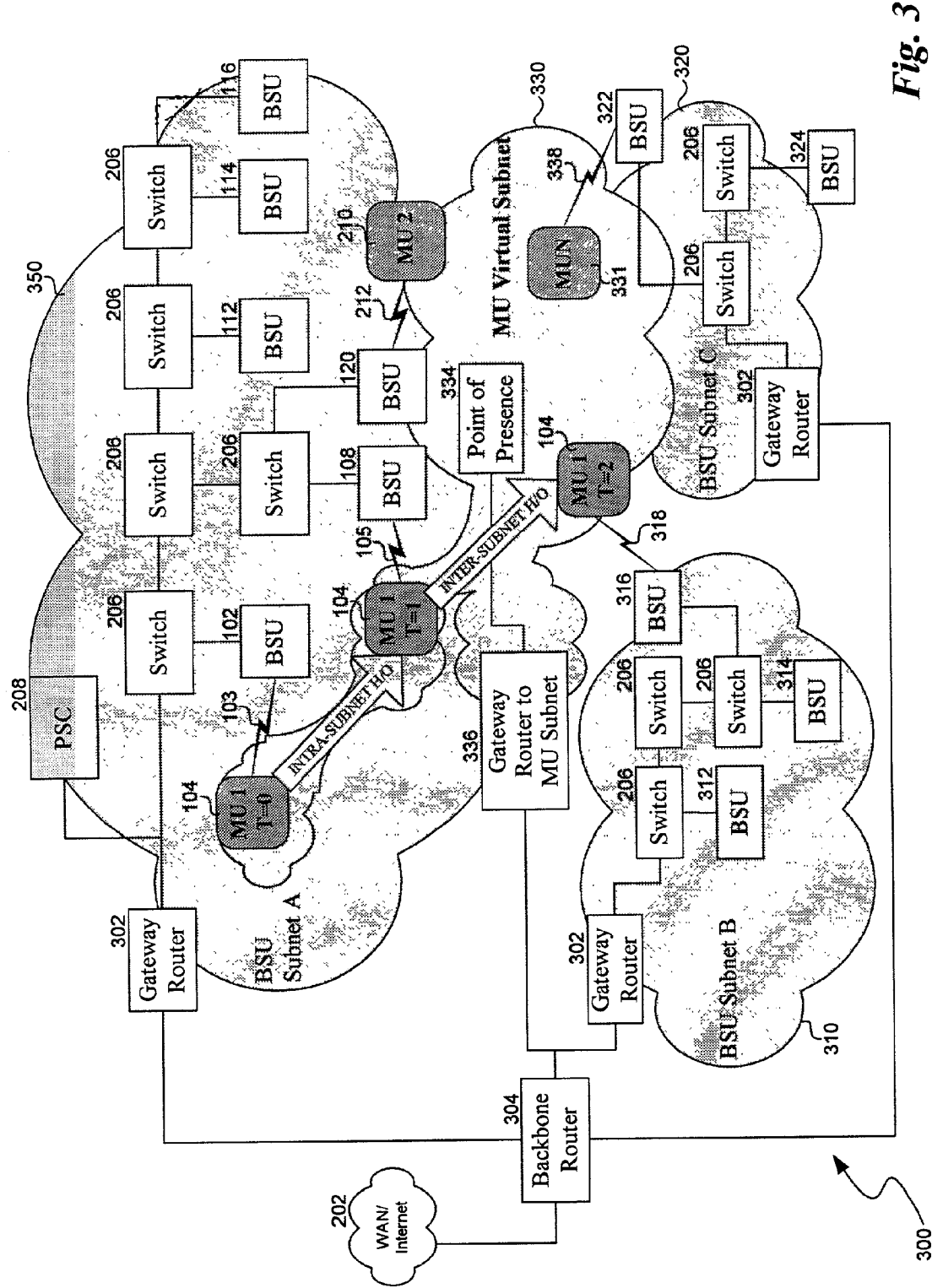
FIG. 3 is a block diagram of a multiple subnet architecture where base station units and mobile units are assigned addresses that fall within multiple IP subnets, and mobile units belong to a separate subnet dedicated to mobile units and their point of presence.

The PMN described in FIG. 3 (the multiple subnet architecture) follows a model similar to GPRS. A simplifying factor is that the PMN uses Ethernet within a network. Once a node (e.g., BSU) makes itself known to the network (described below), the switches and routers 206 that comprise the network will keep track of the correct routing for packets addressed to that node. Another simplifying factor is that the FIG. 3 PMN architecture is a fully-routed network.

Multiple subnets may be interconnected to create a larger network where BSUs and MUs are assigned IP addresses that fall within multiple subnets. As shown in FIG. 3, a network 300 includes three subnets 350, 310 and 320, each connected by an MU virtual subnet 330 that includes an MU 331 and the MU 104. As shown, all three subnets 350, 310 and 320 are similar to the previously described network 200 except that none of them contain the subnet to which the MUs belong: the first subnet 350 includes the BSUs 102, 108, 120, 112, 114 and 116, coupled to switches 206, which in turn are coupled to the gateway router 302; the second subnet 310 includes BSUs 312, 314, and 316 coupled to switches 206, which in turn are coupled to a gateway router 302, while the third subnet 320 includes BSUs 322 and 324 coupled to another gateway router by way of switches 206. Between subnets, packet traffic passes through the gateway routers 302 to gain access to a backbone, which can be a backbone router 304. The gateway routers 302 are typically edge routers and may be running, for example, NAT. Alternatively, NAT may be run on the backbone router 304.

Figure 4:
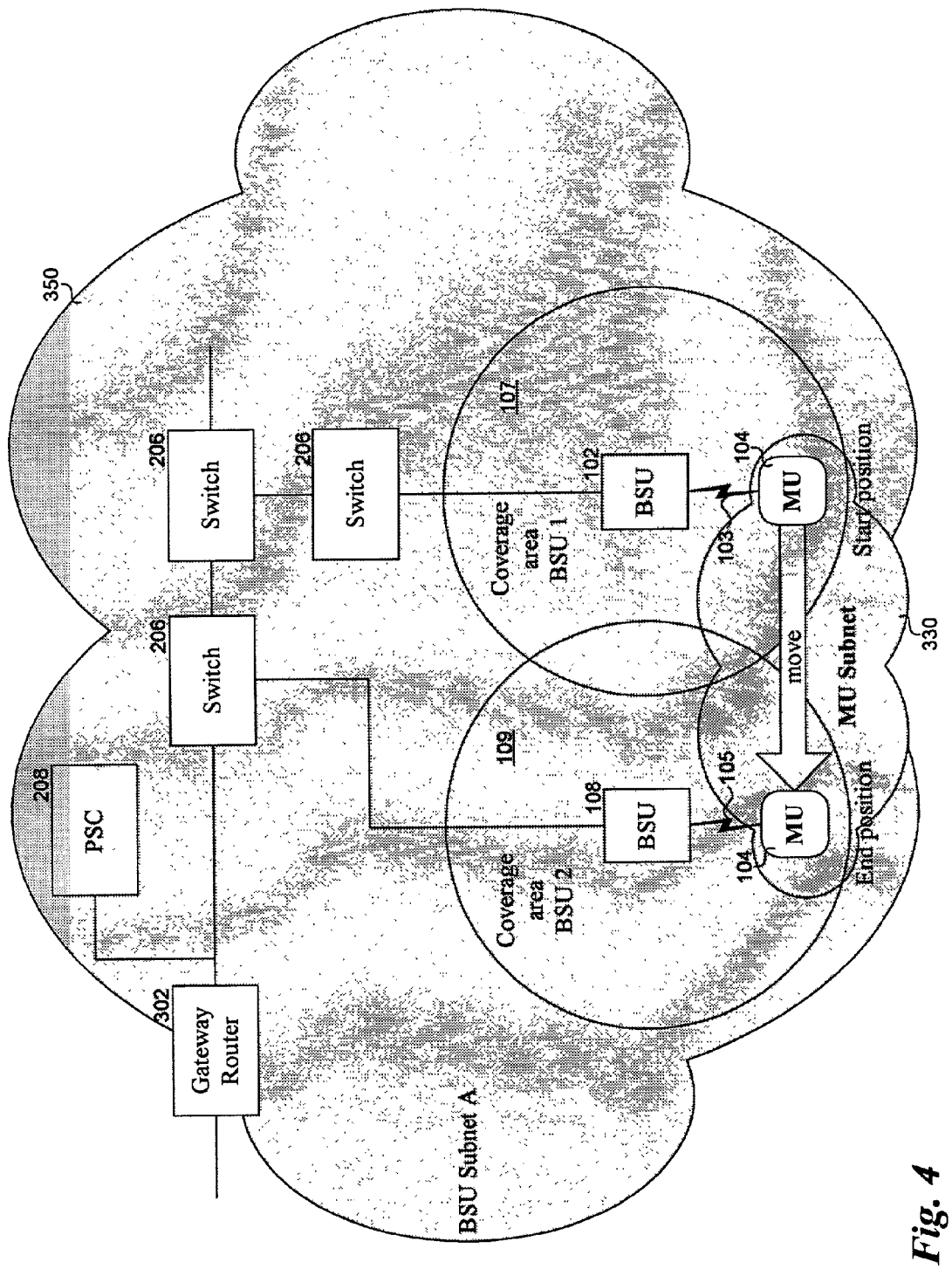
FIG. 4 is a block diagram illustrating an intrasubnet handoff from one base station unit to another under the network of FIG. 3.

FIG. 3 illustrates both intrasubnet and intersubnet handoffs within the multiple subnet architecture. An intrasubnet handoff, such as between BSUs 102 and 108, is shown in more detail in FIG. 4. Such an intrasubnet handoff is similar to that described above with respect to FIG. 1 and is defined as a handoff where the initial or owner BSU and neighbor or target BSU are on the same subnet.

Figure 5:
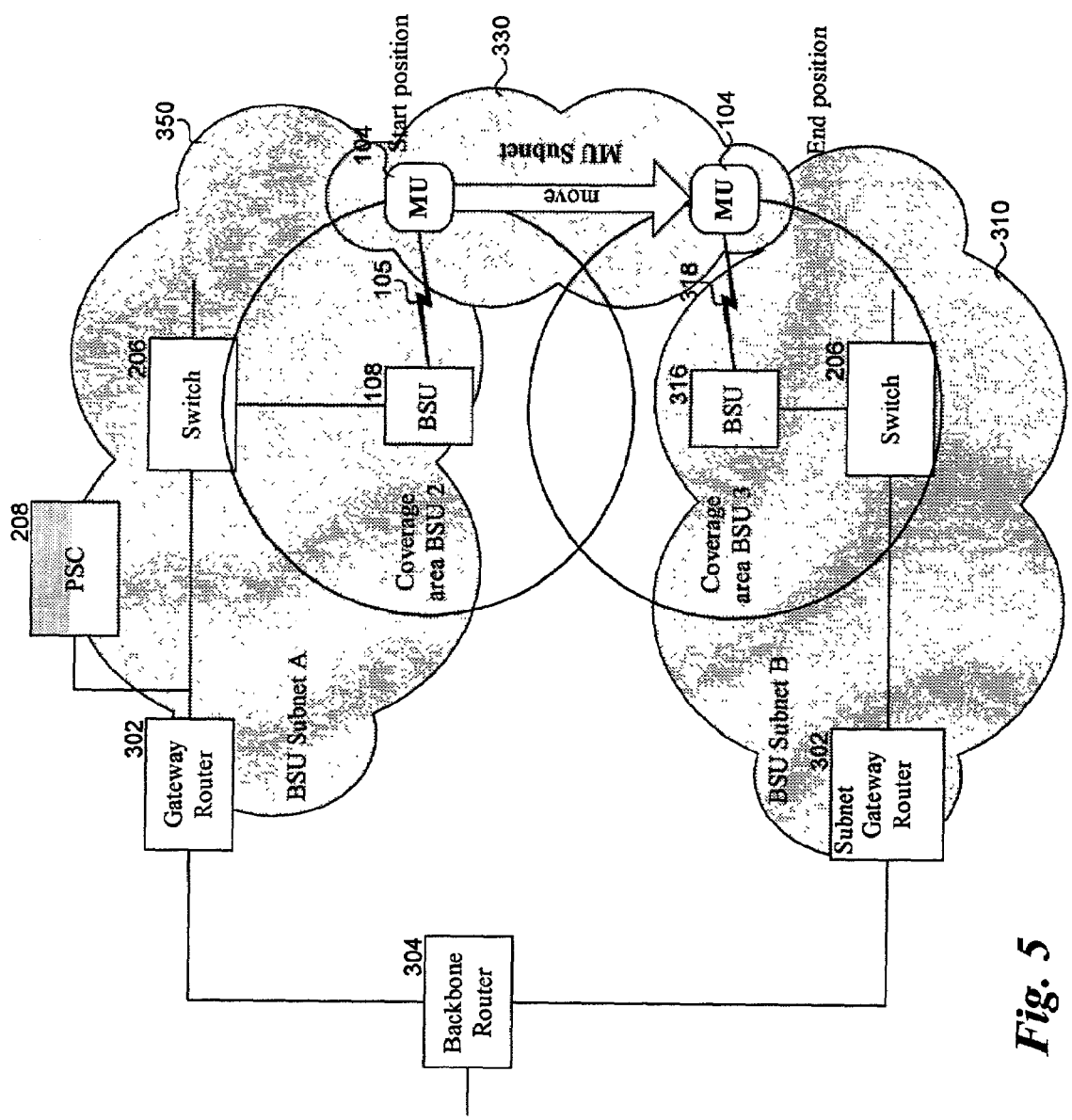
FIG. 5 is a block diagram illustrating an intersubnet handoff of a mobile unit from a base station unit in one subnet to a base station unit in another subnet under the network of FIG. 3.

Alternatively, and shown in greater detail in FIG. 5, an intersubnet handoff is defined as a handoff where the initial and target BSU are on different subnets, such as the BSU 108 associated with the first subnet 350 and the BSU 316 associated with the second subnet 310. The mobile unit 104 moves from the domain of the BSU 108 to the domain of the BSU 316. The wireless link 105 with the BSU 108 is dropped in favor of a new wireless link 318 established with the BSU 316.

The multiple subnet architecture ("MSA") shown in FIG. 5 forms a virtual subnet for the mobile units and set of BSUs together with a point of presence 334 (shown in FIG. 3). The point of presence 334 is defined to be the device on the MU virtual subnet 330 that is physically attached to the wired LAN or network (coupled to the backbone router 304 by way of a gateway router 336). The MU subnet 330 is a real subnet in a logical sense, and is logically attached to each of the BSU subnets 350, 310 and 320 by way of the point of presence 334.

Figure 6:
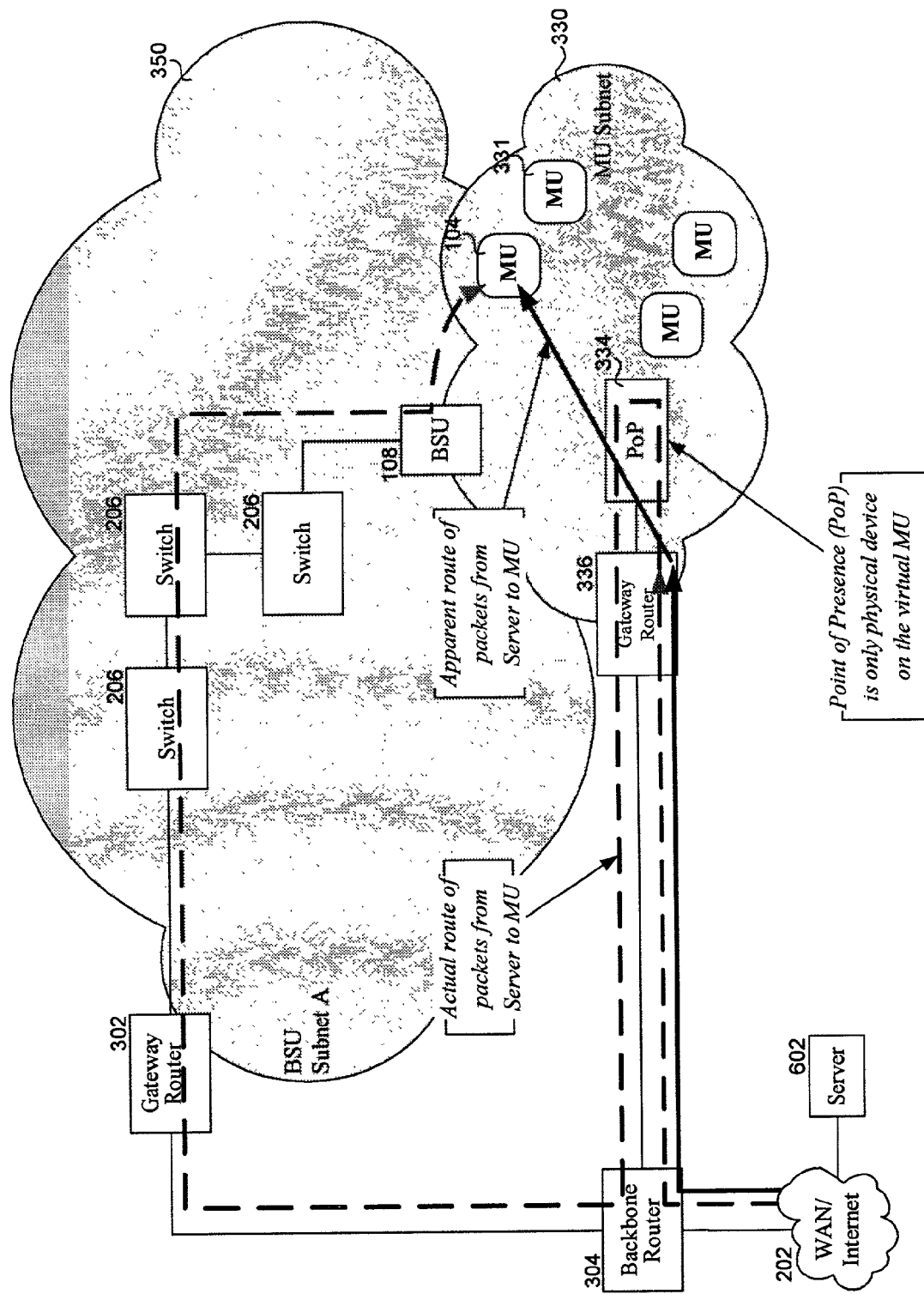
FIG. 6 is a block diagram showing logical and actual routes of packets from a host or server to a mobile unit under the network of FIG. 3.

FIG. 6 shows how the gateway router 336 provides access to the MU subnet 330 and the point of presence 334. The gateway router 336 may be a separate device, or it may be combined with the point of presence 334. The logical route for packets from a host or server 602 to, for example, the MU 104 is over the wired LAN or backbone network to the point of presence 334 and directly to the MU (as shown as the solid arrows in FIG. 6). The actual route of packets is not directly from the point of presence to the MU but back through the gateway router 336, backbone router 304, gateway router 302 associated with the subnet 350, through switches 206 and to the BSU 108, all over the backbone network. Mobility under IP, such as via a tunneling protocol, provides communication between the point of presence 334 and the appropriate BSU 108. The point of presence 334 may be part of the system controller 208, or it could be distributed across one or more BSUs. The point of presence and system controller are shown as two separate entities in FIG. 3 because they are logically separate. They may be implemented, however, as separate blocks of code on a single server (e.g., a single Linux server).

Slot Alignment

Base stations and network access points in a wireless communication system are typically not synchronized with each other. In frequency hopping spread spectrum ("FHSS") systems, each base station starts its hopping sequence at an arbitrary time based on its own internal clock. Since time slot durations are also based on the internal clock, slot widths of neighboring base stations vary as well due to variations in the frequency of the internal clocks. Consequently, neighboring base stations will most likely not have their slot edges aligned in time. This situation adversely affects throughput in wireless systems whose base stations have overlapping coverage, particularly in systems where base station-to-base station handoff occurs.

One source of throughput loss occurs when adjacent base stations hop to the same frequency ("channel collisions"). Any mobile units (MUs) that happen to be in the overlap range where they can "hear" both base stations will experience interference when both base stations transmit on the same frequency. Any MU data transmitted during that interference is lost and will have to be retransmitted after one or both base stations have hopped to differing frequencies. Since the slot edges of adjacent base stations are most likely unaligned, a channel collision will most likely interfere with portions of not one but two slots. Thus twice as much data is potentially lost in the whole system and would have to be retransmitted, thereby decreasing throughput.

Figure 7A:
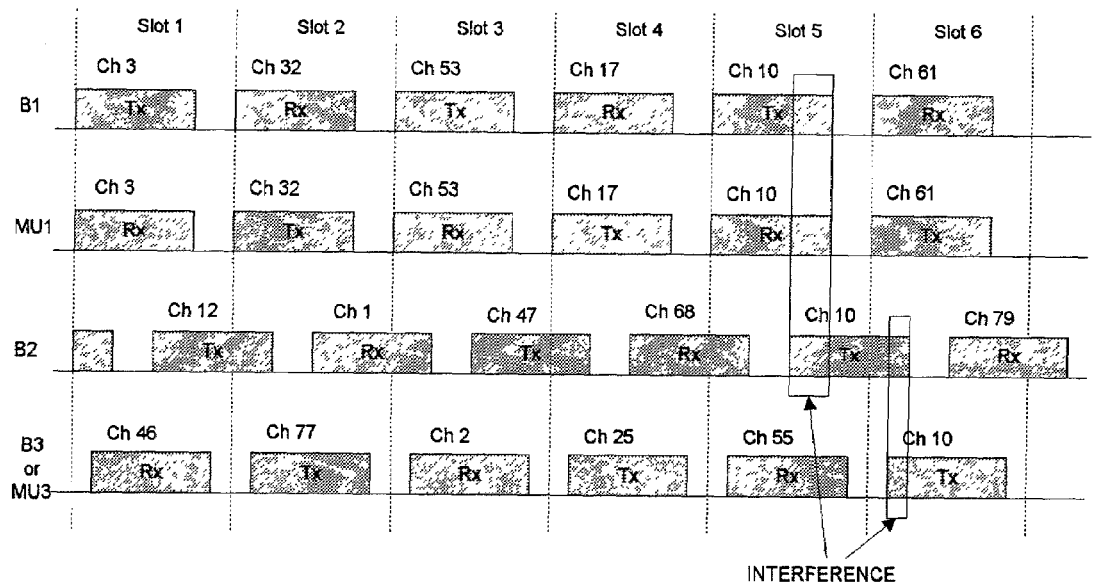
FIG. 7A is a timing diagram showing interference in unaligned prior art methods.

This is illustrated by FIG. 7A. In the unaligned case, a channel collision is shown when base stations B1 and B2, and a third device all hop to Channel 10. (The third device could be another base station or, in this case, receive time ("Rx") of a mobile "MU1".) B2's transmission time ("Tx") overlaps parts of each of the other two, resulting in interference in parts of slots 5 and 6. Thus the data in both slots 5 and 6 is lost for all of these devices.

Figure 7B:
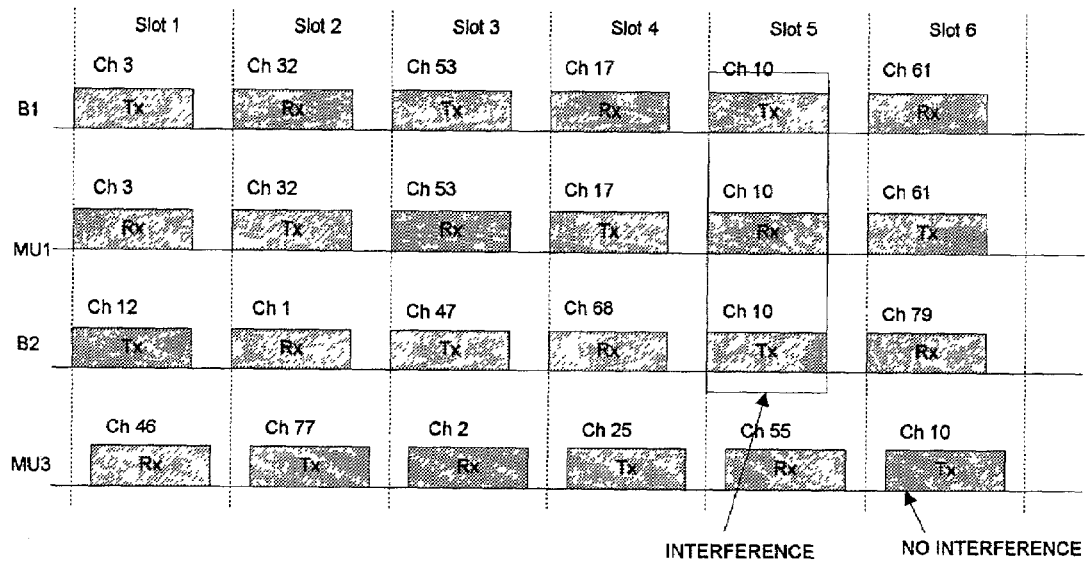
FIG. 7B is a timing diagram showing an aligned method under an embodiment of the invention.

In the aligned case shown in FIG. 7B, B2's transmission time overlaps only with that for B1, and thus lost data is limited to a single slot (slot 5). Note that the non-overlapping device in this case would be a mobile (MU1) since all the base stations are aligned.

To look at this another way: in the unaligned case there is one chance in 79 that for slot 5, the trailing edge of B1's transmission slot ("Tx") and the leading edge of B2's Tx will both be on channel 10 (for Bluetooth, which employs 79 available channels). There is also one chance in 79 that, for the same slot, the leading edge of B1's Tx and the trailing edge of B2's Tx will both be on channel 10. Thus for any given slot, for a given pair of devices, the probability of a channel collision is 2 in 79 for the unaligned case. In the aligned case, the probability is halved (1 in 79).

Consequently, slot edges of neighboring base stations should be aligned so that during a channel collision only a single slot is affected. Channel collisions will occur in such a system, and are largely unavoidable, but synchronizing base station slot edges will mitigate adverse effects by minimizing the number of slot transmissions that experience interference.

Synchronizing base stations also improves base station-to-base station handoff performance, such as in the PMN described above. With unaligned base stations, a mobile unit being handed off from a first base station to a second must resynchronize its time slots to match the second base station. Unproductive time lags result while waiting for portions of one or more time slots to elapse. With synchronized base stations, the second base station is able to make its "first" time slot after a hand-off occur exactly where the first base station's "last t+1" time slot would have been, thus eliminating the need for the mobile unit to resynchronize after hand-off.

As noted above, the Bluetooth method of time division duplex ("TDD") causes two types of slots to be present in any system: transmit and receive. If the slot edges are aligned, two different patterns for slot accesses from the perspective of the BSU are possible:

```
Pattern 1:
0123456789
TRTRTRTRTR or

Pattern 2:
0123456789
RTRTRTRTRT
``` where the "T" represents a time slot in which the BSU can start a transmission, where "R" represents a time slot in which the BSU can receive from a slave and where numbers 0–9 simply represent sequential slots. (In the discussion below, an MU is discussed, even though any "slave" may be employed.)

If there are two MUs communicating with a BSU that has only one BTS, the following three situations can occur.

1. Both MUs employ Pattern 1:

The BTS can transmit and receive easily in all time slots

```
0123456789
TRTRTRTRTR
```

2. Both MUs employ Pattern 2:

The BTS can likewise transmit and receive easily in all time slots.

```
0123456789
RTRTRTRTRT
```

3. One MU employs Pattern 1, while the other employs Pattern 2:

Here, however, the BTS "loses" one slot every time communication is switched from one MU to the other.

```
0123456789
TR TR TR T
11 22 11 2
```

In a first embodiment, when a BSU has more than 1 BTS (such as the BSU 120 of FIG. 2B), the MUs with different patterns can be separated, allowing one BTS to run on Pattern 1 and another to run on Pattern 2. This separation works up to a point. If the BTSs which transmit on one pattern are off limits to the MUs on the other pattern, and the BTSs are divided evenly, the BSU could have no more slots for an incoming MU or slave when the BSU is only half full. This would cause dropped calls on a 50% utilized network, which is an inefficient use of resources. In other words, if half of a BSU's radios have their even-numbered slots for Tx and the other half have their even slots for Rx, and if the first type of radios are full and the second type have no MUs, then an incoming MU having the second slot pattern will not be handled and the call will be dropped, even though half of the BSU's radios are idle.

In a second embodiment, if the BSU allocates BTSs a pattern as necessary, once the BSU has allocated all the BTSs, an incoming MU who's pattern is associated with a full BTS, the MU has no slot on which to attach. This is not a major problem when there are 20 BTSs in a base station, as the base station must be over 90% full before this situation could occur. On a base station with only 4 BTSs though, a utilization of just over 75% could yield this condition. This would happen, for example, when 3 BTSs are assigned to Pattern 1 and completely utilized. The fourth BTS has one MU and is assigned to Pattern 2. Another MU on Pattern 1 enters the BSU's area. Since there are no slots available on the 3 BTSs, and the fourth is assigned to Pattern 2, the MU is dropped. In other words, the BTS radio slot patterns in this embodiment are not determined statically, but rather dynamically, as MUs enter the BSU. In the example of a 4-radio BSU, three of the BTSs encountered MUs on slot Pattern 1 (and therefore are set to Pattern 1) and one BTS is set to slot Pattern 2 based on an incoming MU having this pattern. When the Pattern 1 BTSs become full, no further Pattern 1 MUs can be hosted, even though 25% of the BSU capacity is still theoretically available In a third embodiment, the BSU operates in the same way as in the second embodiment. However, when, as in the example above, three BTSs are assigned to Pattern 1 and are completely utilized, while a fourth BTS has only one MU, and is assigned to Pattern 2. When a second MU on Pattern 1 enters the BSU's area, the BSU allows the MU to join, but accepts the inefficiencies on that channel. Thus, allowing the new Pattern 1 MU to be hosted on the Pattern 2 BTS causes the Pattern 2 BTS to have the pattern-switching inefficiencies described above.

Another resource allocation issue is as follows. Assume, for example, that there are 7 MUs, but they have very minimal traffic, and another 7 MUs that have very high traffic demands. The minimal traffic MUs are on Pattern 1, and the high traffic MUs are on Pattern 2. This situation results in poor resource allocation. The high traffic MUs should be spread to BTSs with low traffic MUs, and allow all the BTSs to serve the MUs to the best of their ability. This would result in the same inefficiencies of the traffic for the third embodiment, where some MUs are on slot pattern 1 and some are on pattern 2.

In a fourth embodiment, which makes administration of the BTSs and resource allocation easier, all MUs are set to the same pattern as they enter the network, and all BTSs employ the same pattern. The MUs could be moved from one BTS to another for pure resource reasons, without having to allocate a BTS to a particular pattern, or lose slots to the inefficiency of pattern switching. In other words, all MUs and all BTSs use a single slot pattern. In this embodiment, the potential unused BSU capacity problem and pattern-switching overhead described above paragraphs would not be present.

A disadvantage of this fourth embodiment is that all BTSs would be transmitting at the same time. In a network where there are only one slot packets, this would be beneficial, because the transmit/receive antennas would not need to be separated. In other words, no transmissions occur during reception slots, and vice versa. In a network of multiple slot packets, this would mean larger amounts of RF energy released into the air while a receive antenna is trying to receive.

Under a fifth embodiment, the BSU may be field configurable by a technician to employ any of the above five alternatives. Thus, a technician can select the best transmission patterns and allocations for BTSs, and change that configuration as circumstances later change after initial configuration. Alternatively, the system controller 208 may monitor transmissions of the individual BSUs and automatically allocate the appropriate transmission pattern.

Modifying Slot Usage Embodiment

Initial base station synchronization can be done at PMN initialization time during base station neighbor discovery. During normal system operation base stations may communicate with each other the "backend network," noted above.

Thus, base stations may identify one another, and particularly neighboring base stations, by employing the backend network. Alternatively, base stations may be able to automatically identify their neighbors as described in greater detail in U.S. Provisional Patent Application No. 60/262, 558, filed May 2, 2001. In one embodiment, base station synchronization uses dedicated radio transmit slots to communicate directly, e.g., over the air, with other base stations. In one embodiment, a predefined number (e.g., 64) transmit/receive (TX/RX) slot pairs are used, with 128 total slots available for base station synchronization. These slots may also be shared with the base station remote MU monitoring function, where "unconverted Rx slots" per cycle are when the BSU will monitor the signal strength of MUs.

Figure 8:
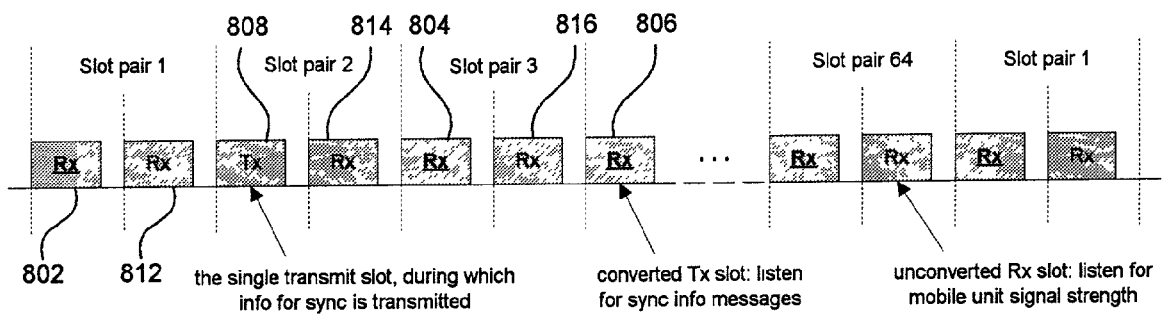
FIG. 8 is a packet timing diagram employing an embodiment of the invention for assigning transmit and receive slots within each slot pair.

The Bluetooth protocol employs time division duplex ("TDD"), where pairs of transmit and receive slots are repeated. For Bluetooth compatibility, one embodiment uses a repeating cycle of 64 TX/RX slot pairs, or 128 slots total. Normally half of these would be used for transmitting and half for receiving, but one embodiment of the invention converts all except one of the transmit (TX) slots into receive (RX) slots for more effective monitoring. Unconverted RX slots are used for monitoring MU strength and converted TX slots are used for listening for sync information messages from other base stations. The single remaining TX slot is used by that BSU to broadcast its sync information once every 128 slots (i.e., at 80 millisecond intervals). Which slot pair (1–64) contains the single TX slot is what gets decided during sync initialization. This slot will remain assigned to that base station unless it becomes necessary to change it, as described below. Each base station thus moves back and forth between two roles during the ongoing synchronization process: every 80 millisec, for one slot time, it acts as a "sync server" by providing its synchronization information to any base stations around it who are listening; any base stations within range can detect this special "sync" message, if they have been synchronized, and will use it to synchronize themselves. Then, for nearly half of the time, the base station acts as a "sync client" by listening for sync information from other base stations. For the other half of the time, the base station performs its normal listening for mobile unit signal strength. (During at least every resynchronization, the BSUs must continue to monitor for MU traffic.) FIG. 8 illustrates this method.

Referring to FIG. 8, an example of a base station unit that has selected slot 2 during the initial synchronization process is shown. During synchronization, each transmit slot has been converted to a receive slot (e.g., slots 802, 804 and 806) where the base station unit listens for synchronization information from neighboring base stations (thereby acting as a sync client). A single unconverted slot, namely slot 808, is the only slot in 64 pairs that this base station unit transmits its own synchronization information (thereby acting as a sync server). The remaining receive slots (e.g., slots 812, 814 and 816), are when the base station unit listens for mobile unit signal strength.

In one embodiment, each BSU employs various layers of software under the Bluetooth protocol. Each BSU further includes radio environment monitoring ("REMon") and radio environment management ("REMan") software, that includes a radio environment management component that operates above the host controller interface ("HCI"), and a radio environment monitoring component that operates below the HCI, together with baseband components of the Bluetooth protocol. BSU neighbor discovery and BSU synchronization functions are performed in conjunction with the REMan and REMon components, within the radio environment monitoring and management software. The REMon component functions to receive a set of records from REMan, where the records indicate which MUs to monitor. Each record in the set identifies the MU to monitor, performance indicator types to be measured (e.g., signal strength, signal to noise ratio, error rate, etc.), and the time slot the MU is to be monitored on. The REMon component works with a Bluetooth link controller to convert all except one of the transmit (TX) slots into receive (RX) slots, as described above. Modifying the baseband layer of the Bluetooth protocol stack in the BSUs will permit such a modification in slot assignments to occur. Following synchronization, the BSU returns to a standard Bluetooth TDD, where pairs of transmit and receive slots are repeated. Further details regarding software employed by the BSU are provided below and in the related applications cross-referenced above.

Further details regarding REMan 808 and REMon 814 include the following. REMan 808 supports mobility by providing the following functions: REMan obtains current records for existing links from a mobility manager; REMan obtains latest neighbor BSU identities from a neighbor discovery routine (further details regarding neighbor discovery are found in a co-pending U.S. patent application entitled Wireless Base Station Neighbor Discovery in a Communications System, Such as a System Employing a Short-Range Frequency Hopping Scheme, as noted herein); REMan obtains performance indicators for links it manages (as the owner BSU); REMan obtains performance indicators from REMan components of neighboring BSUs; and merges such indicators; likewise, REMan collects and forwards performance indicators for MUs when requested to do so by REMan components of neighboring BSUs. REMan 808 also evaluates performance indicators of each link it owns in order to do the following: use its own performance indicators and those collected from neighboring BSUs; make decisions on when to request performance indicators from neighboring BSUs; make handoff decisions based on such evaluations; provide one or more target BSUs for a handoff; inform the mobility manager of handoff requirements, and identify the target BSU; and supply an alternative target BSU information when requested to do so by the mobility manager.

REMon 814 receives a set of records from REMan 808 that indicate the MUs that REMon should monitor. Each record in the set identifies the MU to monitor, to perform its indicator types to be measured, and the timeslot the MU is to be monitored on. REMon 814 then sets an assigned RF controller (not shown) to receive using the link context for each MU at the assigned timeslots and measure the performance indicator specified in the record. REMon 814 then again associates the performance indicators with the particular MU or link context, and sends them back to REMan 808 for processing.

Representative Embodiment

During the course of two base stations discovering each other as neighbors they learn whether each other has accomplished slot assignment. If neither has, then they can go no further in the synchronization process, so they record each other as neighbors in their respective neighbor lists and wait until later when one of them does become synchronized, as described below. If both are already synchronized then they just record each other as neighbors. If one has been synchronized and one has not then the unsynchronized base station makes its sync slot selection based on the slot assignments of its neighbors and its neighbors' neighbors, as described below.

The base stations perform synchronization autonomously. The concept here can be visualized by imagining how a water drop generates a ripple in a pond: the waves start at one point and spread outward in all directions. The initial synchronization "water drop" starts at an arbitrary base station in the PMN called the origin, or "seed," base station. After the synchronization propagates to all edges of the network, the entire PCN will have its slot edges aligned. As described more fully below, the BSUs at the same "radius" from the sync origin will be in sync with each other, because they will be giving and taking hand-offs from each other. The system avoids the situation where the entire PMN is in lock-step, from sync origin to outer edge.

The BSUs preferably employ a re-use distance of at least 2 "waves" for all sync slot assignments. That is, a sync slot assignment that a base station uses to broadcast its sync information must be unique among all its neighbors and among all its neighbors' neighbors. Each wave represents the constellation of BSUs that are the same number of synchronization steps out from the sync origin. Beyond the re-use distance of 2 waves, sync slot numbers can be re-used. In very dense installations 64 available slot assignments may be insufficient for this two-level uniqueness. In that event, the assignable sync slot amount would alternatively be 128 or greater.

Figure 9A:
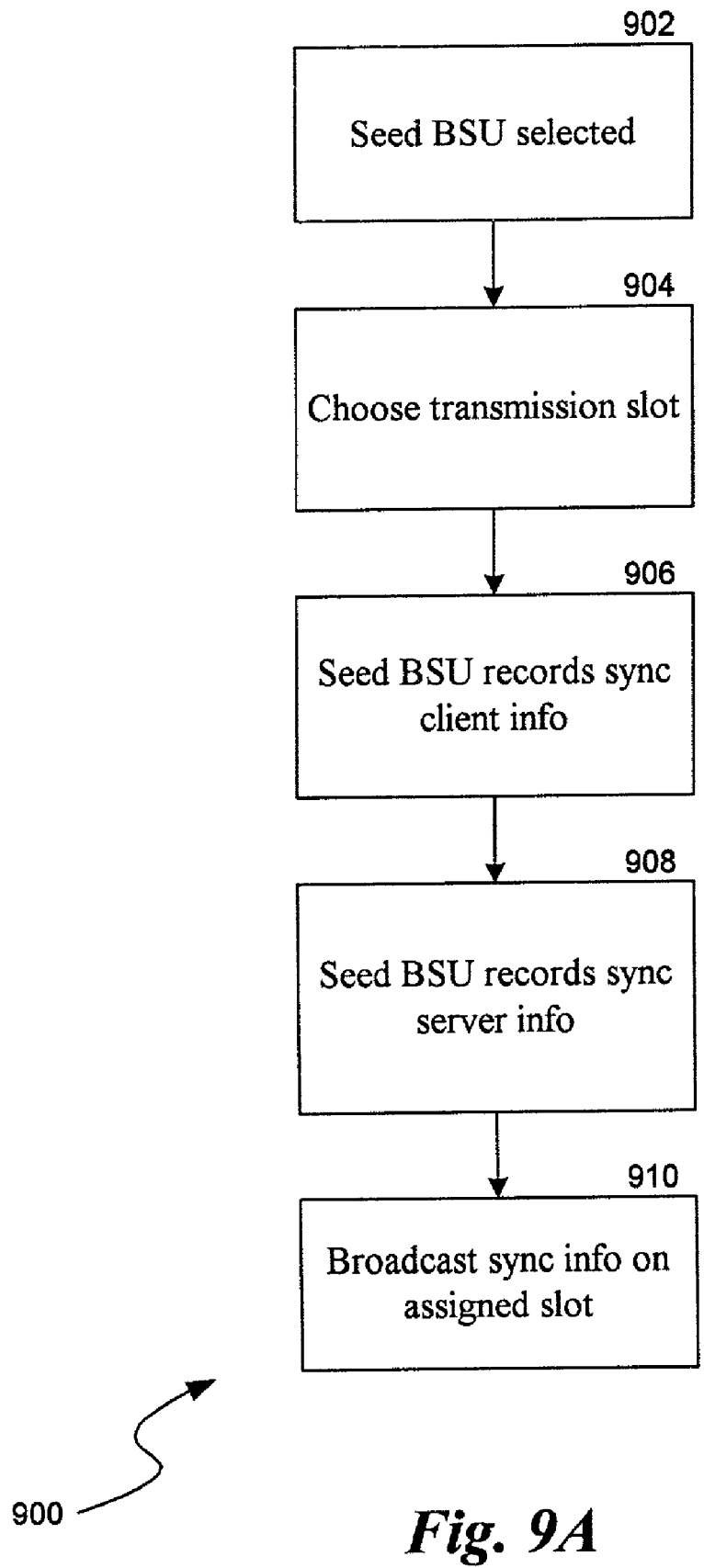
FIG. 9A is a flow diagram illustrating functionality performed by a seed base station under a base station synchronization process.
Figure 9B:
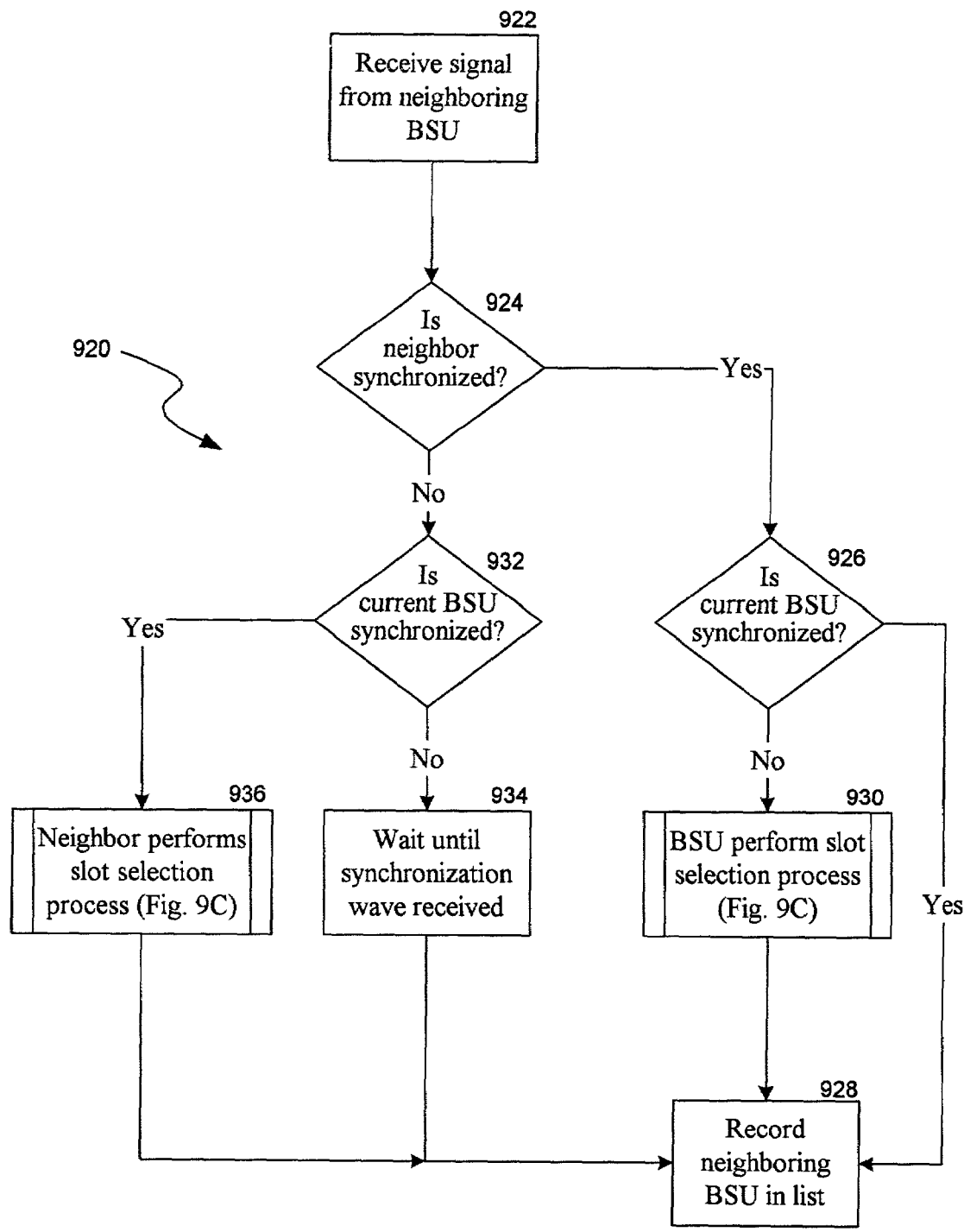
FIG. 9B is a flow diagram illustrating functionality performed by base station units following functionality performed by the seed base station.
Figure 9C:
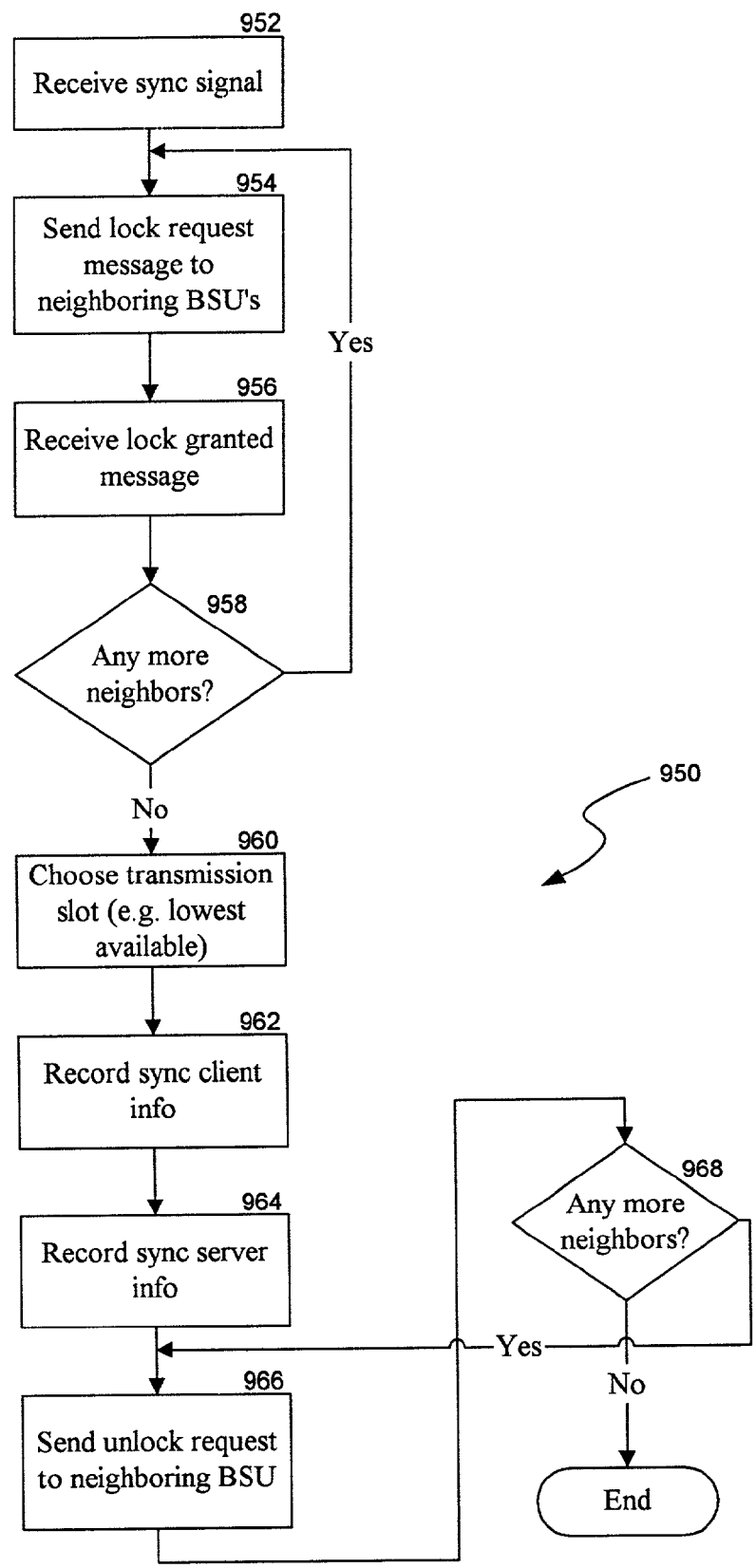
FIG. 9C is a flow diagram illustrating details regarding individual base station synchronization.

Referring to FIGS. 9A–9C, suitable routines for synchronizing neighboring base stations are shown. Unless described otherwise herein, the functions in the blocks depicted in FIGS. 9A–9C are well-known or described in detail in the above-noted and cross-referenced provisional patent application. Indeed, much of the detailed description provided herein is explicitly disclosed in the provisional patent application; most or all of the additional material of aspects of the invention will be recognized by those skilled in the relevant art as being inherent in the detailed description provided in such provisional patent application, or well-known to those skilled in the relevant art.

Referring to FIG. 9A, a routine 900 begins in block 902 by selecting a "seed" or initial BSU. A low-complexity random process may be employed to select the system sync starting point or seed BSU. In one embodiment, the system controller 208 broadcasts a message on the backend network to query base stations. The first base station to reply would be designated as the system sync seed. The system controller would command only one base station to assume this role. Alternative embodiments may employ other mechanisms, such as broadcasting messages between BSUs, and eliminating the intervention or need for the system controller to initiate synchronization.

In block 904, the seed BSU chooses a transmission slot. The slot may be chosen arbitrarily. For example, the seed BSU may select the first transmission slot in the series of 64 available slot assignments (e.g., slot 802 of FIG. 8).

In block 906, the seed BSU records its sync client information. As described more fully herein, the sync client information includes information regarding wave numbers, BSU addresses, and slot assignments for individual BSUs to which a given BSU recording client sync information is a client. Since the seed BSU is not a client of any other BSU (it is only a server), the seed BSU records some null information, such as "0.0" under block 906.

Under block 908, the seed BSU records its sync server information. As described more fully herein, the sync server information includes a wave number designation, an address of that BSU, and the slot which it has chosen to transmit its sync server information. As described below, the seed BSU may record, for example, "1.B4.1" to indicate that BSU B4 transmits its sync server information in slot 1 during Wave 1.

Under block 910, the seed BSU broadcasts its sync information on its chosen slot. Such transmission may be at, for example, the Bluetooth class 2 power level (4 dBm). Indeed, all BSU transmissions during synchronization may be at the class 2 power level.

Figure 10:
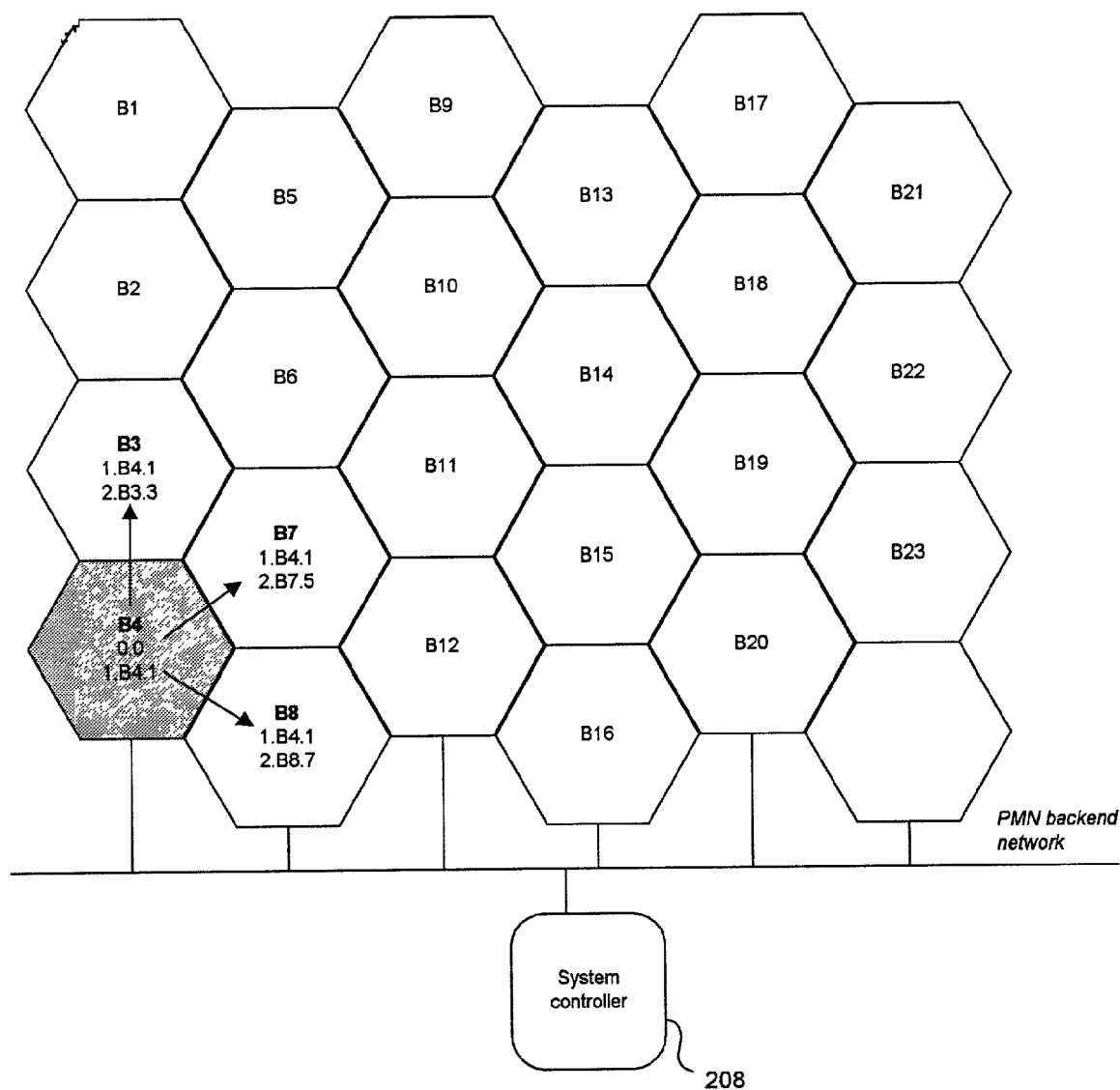
FIG. 10 is a schematic diagram illustrating synchronization from a seed base station to neighboring base stations under a first synchronization wave.

An example of BSU synchronization and initialization is shown in FIG. 10. FIG. 10 shows 23 base stations (represented by designations B1 through B23), which form an overlapping wireless coverage area of a PMN.

Note: the use of hexagons to represent base station cells in FIGS. 10–15 is for clarity only, and avoids the clutter of overlapping circles. There is no implication that, in a PMN installation, a given base station will always have six or less neighbors. In fact, there will most likely be installations where cells are placed such that BSUs have more extensive overlap, and a given base station may indeed have more than six neighbors. If the PMN installation is in a multistory facility, with base stations on adjacent floors, base stations may also be discovered several floors above and below. These are important so that a user walking up or down a stairway can still experience handoff. There is no limit to the number of neighbors that a base station may have.

In FIG. 10, B4 is chosen to initiate the base station system sync process, and thus is the seed BSU. The seed base station is indicated by "0.0" in FIG. 10, which shows the state of system sync after one iteration or "wave."

As noted above, each base station's persistent store or memory records at least two pieces of information about its sync. The format of this information is not as important as the content. The recorded information includes at least the following:
 1. how the base station gets its synchronization (i.e., its sync client information)
 2. how the base station gives its synchronization information to neighbors (i.e., its sync server information)

In each Figure, a base station acting as a sync server is shaded in gray.

In FIG. 10, B4's sync client information is "0.0," which designates that B4 is the PMN synchronization seed base station. Only one base station in the system has this property or value. B4's sync server information is "1.B4.1," which indicates that during Wave 1, B4 sends its synchronization information during slot #1. Thus, under routine 900, the seed BSU, B4, in Wave 0:
 1. chooses to use, in this example, slot 1 to broadcast its sync information
 2. records its sync client information as "0.0"
 3. records its sync server information as "1.B4.1" (wave 1, its unique address (shown here simply as "B4"), slot 1)
 4. begins broadcasting its synchronization information on its assigned slot To continue the water analogy, the ripple now begins to spread as BSU's B3, B7, and B8 each simultaneously and asynchronously try to discover their neighbors and get their own synchronization slot assignment. FIG. 10 also shows one of several possible outcomes of who synchronizes whom during Wave 1. Assume that B3 is the first non-seed base station to get synchronized, followed by B7, and then by B8. Thus, under Wave 1, the following occurs.

Wave 1, BSU B3:
 1. B3 sends B4, and each of B3's neighbors thus far, a "lock request" message so that no other base stations can simultaneously be getting or selecting the same slot. A lock request is similar to a software mutex (i.e., a software lock that indicates to other BSUs that the slot is assigned to that particular requesting BSU, and that other BSUs are locked out of using that slot until it is released by the requesting BSU). The lock request allows only one BSU at a time to perform synchronization, thereby locking out other BSUs from attempting to simultaneously synchronize. Each BSU may, for example, record a table of slots locked by other BSUs in earlier waves. Alternatively, as described herein, each BSU may simply record sync client information that includes slots locked by neighboring BSUs.
 2. B4 returns a "lock granted" message to B3 along with any neighbor's neighbors and their synchronization slots (not established yet under this example). B4 (indeed each of B3's neighbors) will receive a lock-request message. Unless it is already engaged in a similar transaction with another BSU, B4 will return a lock-granted message. In that message it tells B3 all the Tx slots that it (i.e. B4) already knows about as being in use, due to it's (i.e. B4's) neighbors. B3 needs this neighbor's neighbor information to pick a slot that won't conflict. The reasoning is that all of B3's geographic neighbors (e.g. within 17 meters or so when used with mobile units having a 10 meter range) got discovered during Neighbor Discovery, so any slots they use are off limits for B3 to choose as its Tx slot. Then, to cover the case where one BSU's sync broadcast might "carry" farther than normal, the system also disallows any slots in use by any of B4's neighbors' neighbors (which in the example above could be as much as 34 meters or so away from B4). Only when it has all this occupied-slot info can B4 pick a slot that will not collide with one of its neighbors or one of its neighbors' neighbors. Another reason is to ensure that each neighbor can receive from each of its neighbors. If any BSU has two neighbors transmitting on the same slot, it may not be able to hear either one. For example, if B3 chooses and transmits on slot 3, but B8 has already chosen to transmit on slot 3, then intermediate neighbor B7 (which is a neighbor to both B3 on one side, and B8 on the other) will not be able to hear either B3 or B8 if they both transmit on slot 3.

3. This lock/acknowledge interaction is repeated for all remaining B3 neighbors. If any are already locked by another base station, the BSU waits until it is unlocked, then lock it, or selects another slot.
4. B3 realizes that B4 has slot 1 and that no other neighbors are synchronized yet; therefore, B3 chooses an available slot e.g., slot 3.
5. B3 records its sync client information as "1.B4.1" (copied from what B4 broadcast).
6. B3 records its sync server information as "2.B3.3" (wave 2, B3, slot 3).
7. B3 sends an "unlock request" message to B4, then to any remaining neighbors, in reverse order of locking. Following such unlocking, other BSUs that have yet to synchronize may then synchronize themselves.

Wave 1, BSU B7:
1. B7 notices that among his discovered neighbors, B4 has a higher "priority" than B3 since it has a lower wave number, so B7 decides to synchronize to B4, as B3 did.
2. B7 sends a "lock request" message to B4 (which has the lowest slot number).
3. B4 returns a "lock granted" message to B7 along with any neighbor's neighbors and their synchronization slots (not established yet in this example).
4. B7 sends a "lock request" message to B3 (which has the next lowest slot number).
5. B3 returns a "lock granted" message to B7 along with any neighbor's neighbors and their synchronization slots (not established yet in this example).
6. B7 performs a lock request/lock grant message exchange with the rest of its neighbors (none in this example).
7. B7 chooses a slot number, e.g., the next lowest available slot number: "5."
8. B7 records its sync client information as "1.B4.1" (copied from what B4 broadcast).
9. B7 records its sync server information as "2.B7.5" (wave 2, B7, slot 5).
10. B7 sends an "unlock request" message to other neighbors (none in this example), then B3, then B4, in reverse order of locking.

Wave 1, BSU B8:
1. B8 notices that among his discovered neighbors, B4 has a higher priority than B7 since it has a lower wave number, so B8 decides to synchronize on B4 as B3 and B7 did.
2. B8 sends a "lock request" message to B4 (which has the lowest slot number).
3. B4 returns a "lock granted" message to B8 along with any neighbor's neighbors and their synchronization slots (not established yet in this example).
4. B8 sends a "lock request" message to B7 (which has next lowest slot number).
5. B7 returns a "lock granted" message to B8 along with any neighbor's neighbors and their synchronization slots (not established yet).
6. B8 performs a lock request/lock grant message exchange with the rest of its neighbors.
7. B8 chooses, e.g., the lowest available slot number: '7'.
8. B8 records its sync client information as "1.B4.1" (copied from what B4 broadcast).
9. B8 records its sync server information as "2.B8.7" (wave 2, B8, slot 7).
10. B8 sends an "unlock request" message to other neighbors (none in this example), then B7, then B4, in reverse order of locking.

At this point, "Wave 1" is considered finished—neighbors at the smallest "radius," or distance from the seed, have been synchronized.

Referring to FIGS. 9B and 9C, routines illustrating the above functions are shown. As shown in FIG. 9B, a routine 920 begins in block 922 where a receiving or "current" BSU receives a sync signal transmitted by a neighboring BSU. In block 924, the current BSU determines whether that neighbor BSU is synchronized. If so, then in block 926, the current BSU determines if itself is synchronized. If so, then the current BSU simply records the neighboring BSU in its list of neighbors. If not, then in block 930, the current BSU performs the slot selection and other processes described below with respect to FIG. 9C.

If the current BSU in block 924 determines that the neighbor BSU is not synchronized, then in block 932, the current BSU determines whether it itself is synchronized. If not, then in block 934, the current BSU waits until a synchronization wave is received. If the current BSU is synchronized, then in block 936, it allows the neighbor BSU to perform slot selection and other processes as shown in FIG. 9C. Following blocks 934 and 936, the current BSU records the neighboring BSU in its list.

Referring to FIG. 9C, a routine 950 begins in block 952 where the current BSU receives a sync signal from a neighboring BSU. In block 954, the current BSU sends a lock request message to one of its neighboring BSUs. In block 956, the current BSU receives a lock grant message from that neighboring BSU. In block 958, the current BSU determines from its neighbor list whether any more neighboring BSUs exist. If so, then the routine loops back to again perform blocks 954 through 958.

If no additional neighbors exist, then in block 960, the current BSU chooses a transmission slot in which to transmit its sync information. For example, the BSU may choose the next lowest available slot based on slots previously selected by BSUs in this or earlier waves. In blocks 962 and 964, the current BSU records sync client and server information, respectively. In block 966, the current BSU sends an unlock request to the last neighboring BSU that it received a lock granted message from. In block 968, the current BSU determines whether any additional neighbors exist. If so, then the routine loops back to again perform blocks 966 and 968 as the BSU sends unlock requests to neighboring BSUs.

In light of the above details, a discussion of subsequent waves will be described with less detail. Those skilled in the relevant art will recognize that the subsequent waves occur in a manner similar to that described above. Therefore, after Wave 1 ends, Wave 2 commences.

Here, B3, B7, and B8 start acting like sync servers during their designated slot time while base stations at the next radial increment out (i.e., base stations B2, B6, B11, B12 in FIGS. 11 and 12), who are simultaneously and asynchronously trying to get their own synchronizations established, will now start to be successful at it. The steps are the same as described above. The net results of this wave, with assumptions made for the sake of the example, are below.

Figure 11:
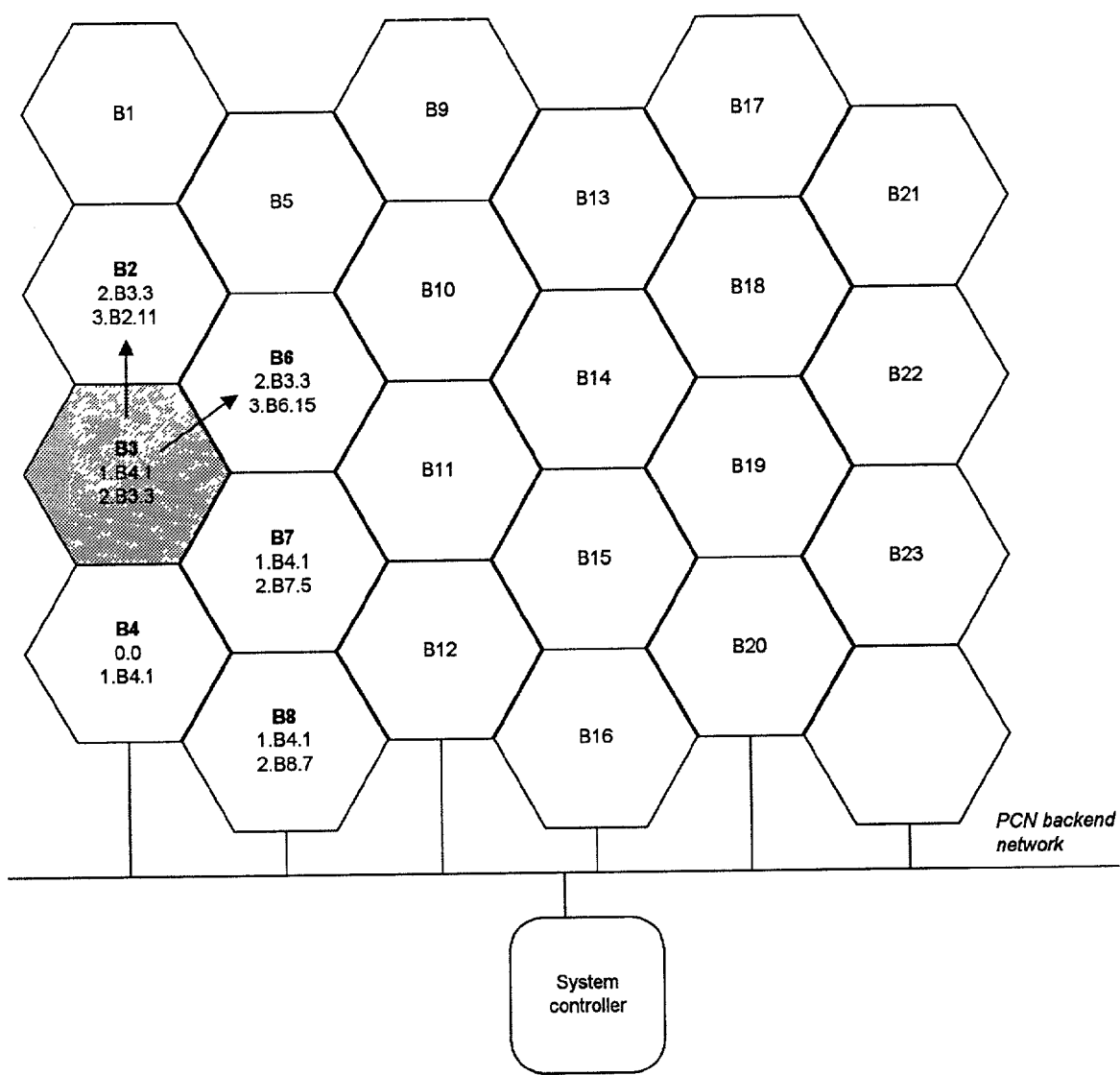
FIG. 11 is a schematic diagram illustrating a first step under a second synchronization wave.

In Wave 2:

Base stations B2 and B6 are first synchronized in this example, as shown in FIG. 11.
1. In this example, B2 gets its synchronization first, from B3, who is B2's only synchronized neighbor.
2. B6 then has three neighbors who have been synchronized (B2, B3, B7); B6 synchronizes off B3 because B3 has the lowest previous wave slot number (3).

Figure 12:
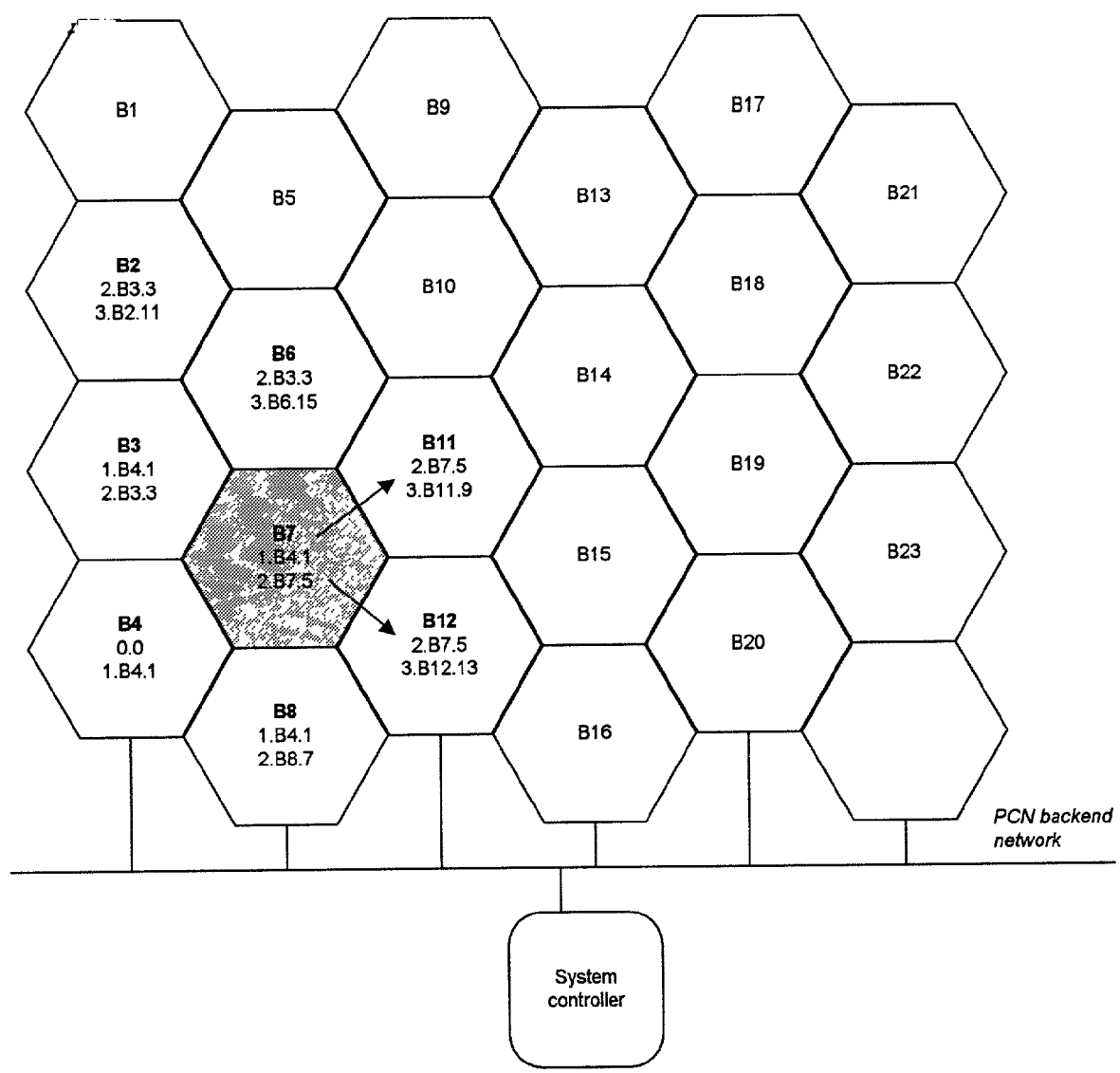
FIG. 12 is a schematic diagram illustrating a second step under the second synchronization wave.

Thereafter, in this example, base stations B11 and B12 get synchronized, as shown in FIG. 12.
1. B11 has two neighbors who have been synchronized (base stations B6, B7); B11 synchronizes off of base station B7 has the lowest previous wave slot number (5).
2. B12 has three neighbors who have been synchronized (B11, B7, B8); B12 synchronizes off of B7 since that has the lowest previous wave slot number (5).

Figure 13:
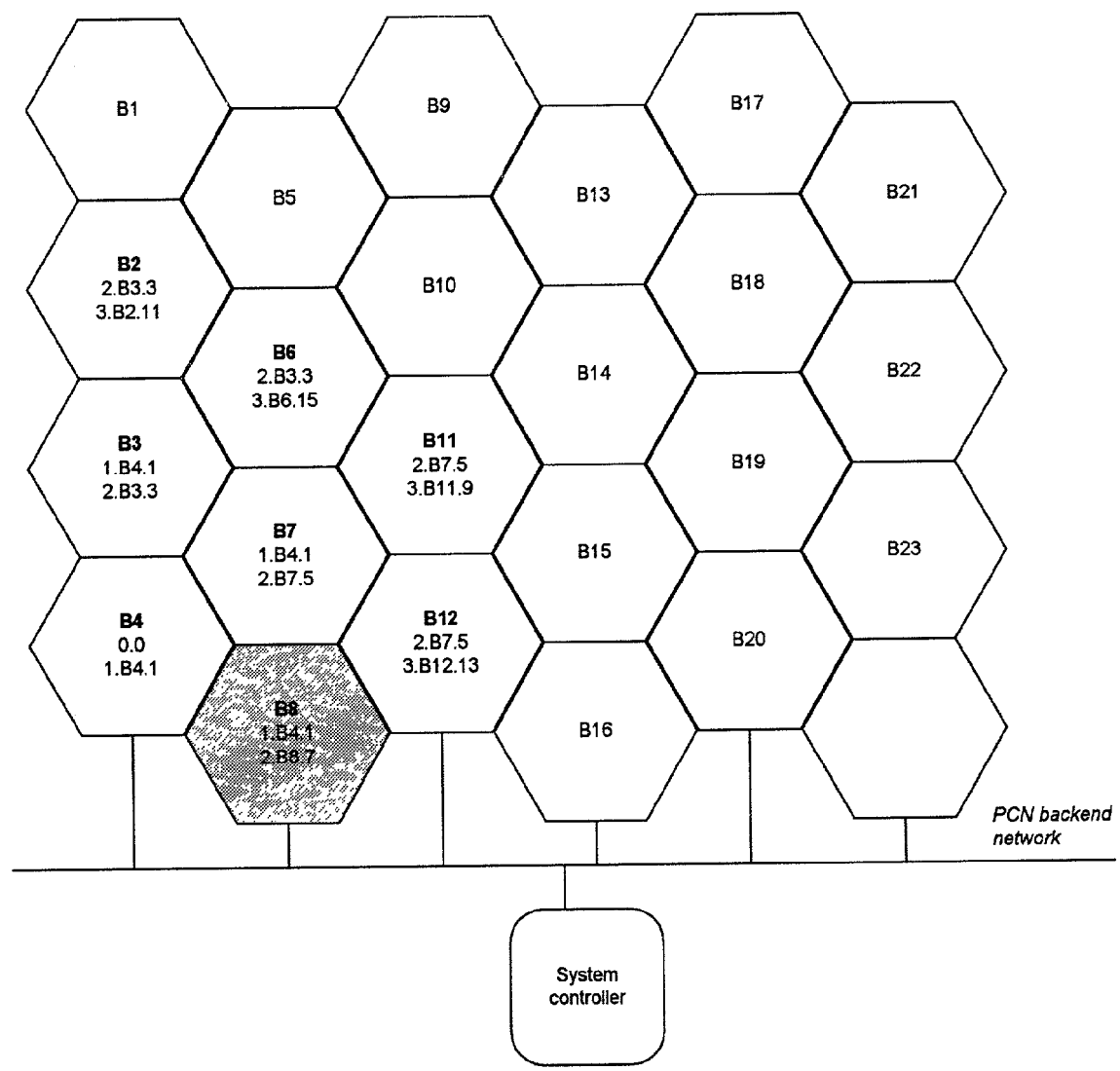
FIG. 13 is a schematic diagram illustrating a third step under the second synchronization wave.

Referring to FIG. 13, base station B8 has no takers for its synchronization services since all its neighbors (B4, B7, B12) are already synchronized.

At this point, "Wave 2" is considered finished since neighbors at this second radial increment have been synchronized.

Figure 14:
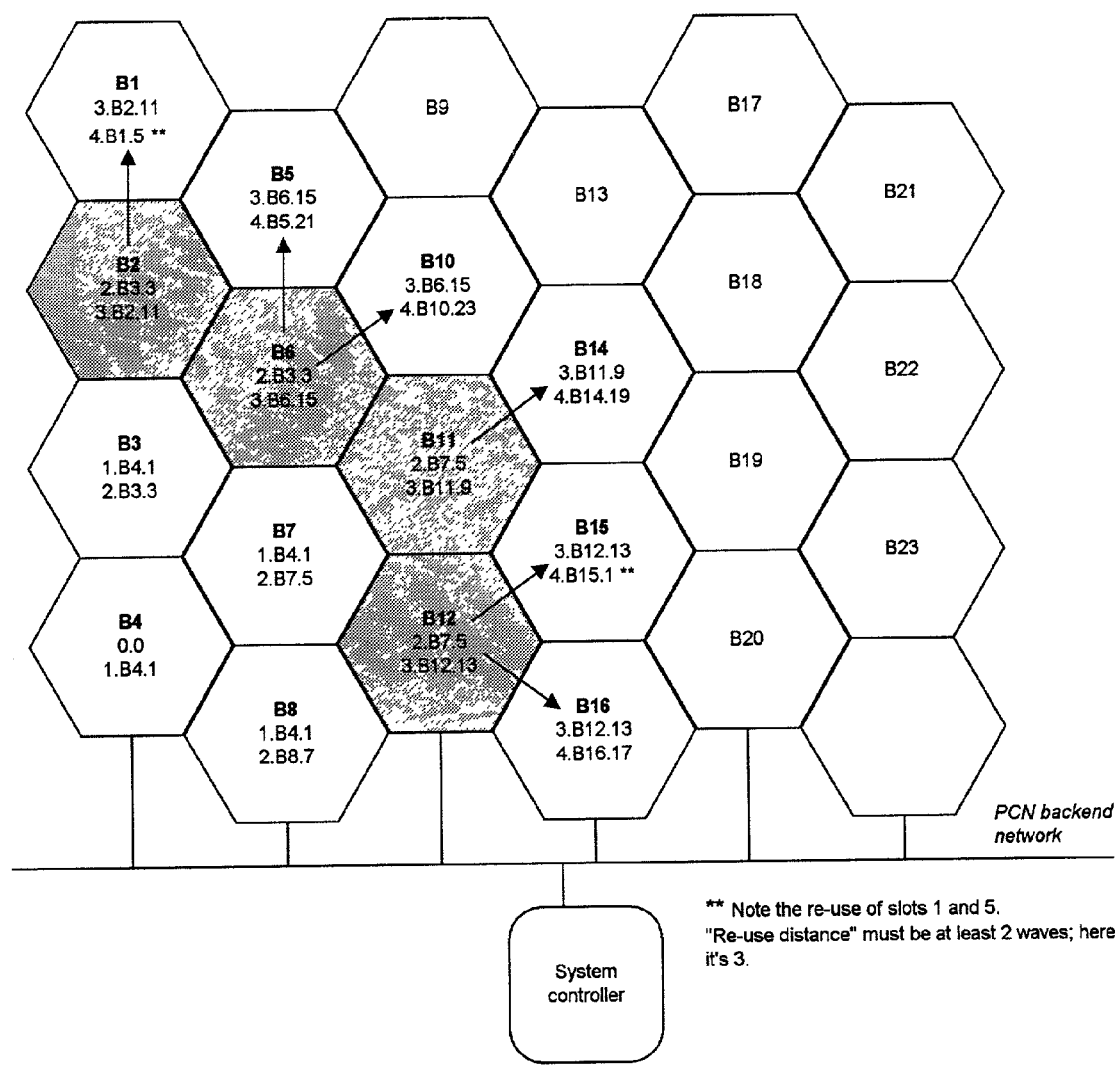
FIG. 14 is a schematic diagram illustrating a third synchronization wave.

Wave 3 now commences. In exactly similar ways as described above, B2, B6, B11, and B12 now begin acting as sync servers and provide synchronization for base stations at the next or third radial increment: B1, B5, B10, B14, B15, B16. The results of this wave are shown in FIG. 14. Note that two slot numbers (1, 5) get re-used in this wave, which is acceptable since the re-use distance must be at least two waves. (Recall that a base station establishing synchronization must choose a slot number unique among its neighbors and its neighbors' neighbors). The process continues with waves 4 and 5 to synchronize base stations B9, B13, B18, B19 and B20, and B17, B21, B22 and B23, respectively, in the same manner as described above.

Having each base station examine the wave number of already-synchronized neighbors prevents back-propagation that would lead to a never-ending synchronization process. The synchronization "wave front" is kept moving forward by requiring a base station in a current wave to establish synchronization with a base station already synchronized during the previous wave.

After the entire network has gone through the above synchronization process once, each base station is now acting in both sync server and sync client roles. The initial synchronization establishment described above has to be repeated only when a base station's neighbor list changes.

Figure 15:
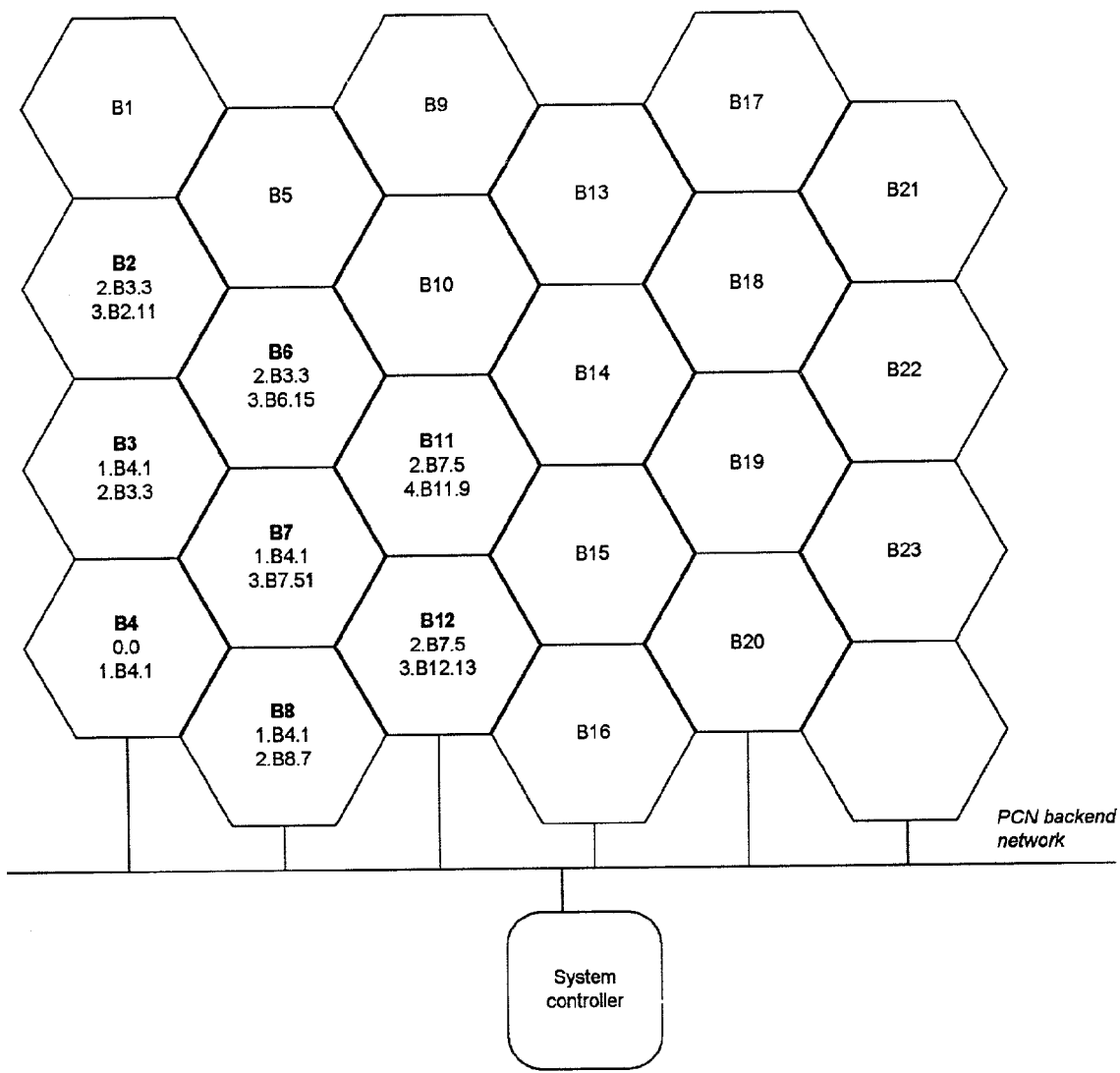
FIG. 15 is a schematic diagram illustrating synchronization when a base station is activated or re-activated after initial synchronization has been established.

What happens if a base station is added or comes up after initial system synchronization establishment? This situation is illustrated in FIG. 15. Assume that B7 comes up after base station neighbor discovery and base station synchronization is completed. It is now in its own unsynchronized pocket. Since B7 wasn't up earlier (e.g., it was added after system initialization), B11 got synchronized one wave later (wave 4) than in the previous scenario. As it discovers its neighbors, B7 notices that all of them are synchronized, so B7 synchronizes off the base station with the earliest wave number and the lowest sync slot number—which is B4 in this scenario. If B4 were down and B7 had to choose among the remaining neighbors, then B7 would choose B3 because of its lower wave 2 slot number. Here, B7 chooses slot 51. B7 also assigns wave 3 to itself since it is between a wave 1 base station and a wave 4 (it could also have chosen wave 2).

If B11 had chosen slot 1 (it could have without violating re-use distance), then there would be a problem because B7 is now coming up between two synchronized base stations both transmitting synchronization information on the same slot. In that case B7 will tell the base station with the later wave number (B11) to choose for itself another slot. Once B11 does so, B7 can proceed to its own synchronization slot selection. B11 having to choose another slot may cause a similar conflict for itself and a neighboring base station. If so then B11 will likewise tell a base station in the next wave further out to choose a new slot, and so on. This reselection may ripple out for an indeterminate number of base station "layers," but it will eventually get resolved even if it does have to propagate all the way to the edge of the PMN.

If neither of two neighboring BSUs are synchronized (and have not chosen a slot), one of the BSUs may page the other when it does become synchronized. The synchronized one may then ensure it is a Bluetooth master so that the BD_Addr and CLK needed for synchronization is communicated to the unsynchronized BSU, and afterwards the unsynchronized BSU may choose a slot. If the synchronized BSU is not a master, then it performs a master/slave switch with the unsynchronized BSU.

As noted above, BSUs in a given ring or radius are generally, but not necessarily, the sync master to BSUs in the next ring farther away from the seed BSU. Therefore, the BSUs are effectively in a "hierarchical" arrangement. BSUs in one ring are synchronized, but may not necessarily be closely synchronized with BSUs in a distant ring. BSUs repeat synchronization periodically, such as at a repeating cycle of 128 slots (80 milliseconds). The "virtual master" clock value that a BSU receives from its sync master during its assigned slot is passed along to that BSU's neighbors during the same 128 slot cycle, during which that BSUs clock may have little time to drift.

Software and Functionality Details

Figure 16:
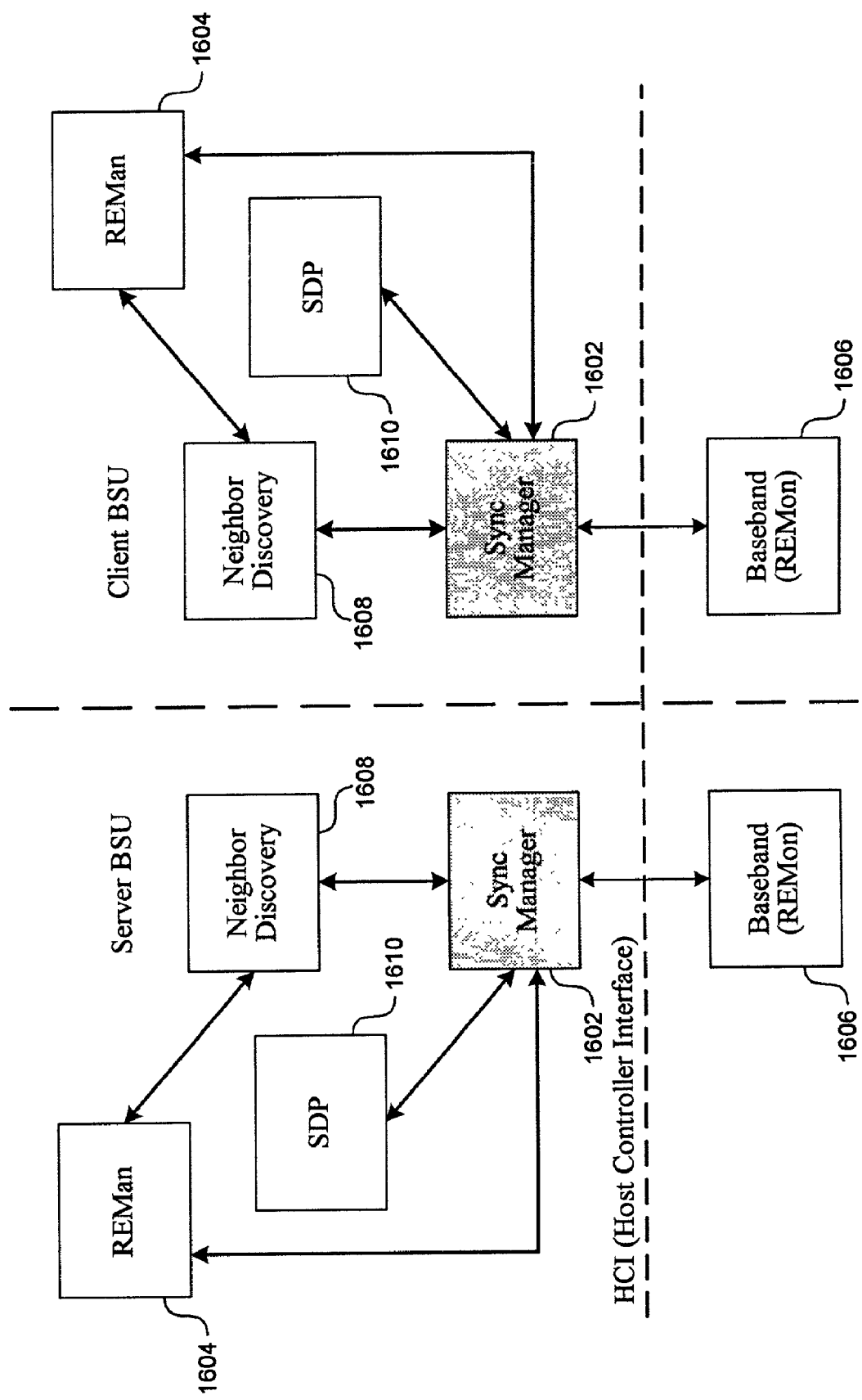
FIG. 16 is a block diagram illustrating software components employed by two neighboring BSUs.

As noted above, each BSU includes REMon and REMan software. A synchronization manager, performing much of the functions described herein, works with REMan (above the HCI), and REMon (below the HCI). Referring to FIG. 16, software operating on two neighboring BSUs is shown. The discussion of software for one BSU is described below; those skilled in the relevant art will recognize that the software is substantially similar to that in the neighboring BSU.

As shown, a synchronization manager 1602 exchanges data and commands with REMan 1604 and REMon 1606. The synchronization manager 1602 functions with a neighbor discovery process 1608 to locate and record the identify of neighbor BSUs. Further details regarding neighbor discovery are found in a co-pending U.S. patent application entitled Wireless Base Station Neighbor Discovery in a Communications System, Such as a System Employing a Short-Range Frequency Hopping Scheme, as noted herein. The synchronization manager 1602 also provides synchronization information to neighbor BSUs so that those BSUs can initiate their own synchronization (when acting as a sync server) and receive synchronization information from neighbor BSUs and update local synchronization (when acting as a sync client), as described herein.

Synchronization is a concurrent process independent of links with mobile units and handoffs of those links. One constraint may be that links with mobile units cannot be made by any BSU that has not achieved synchronization. The synchronization manager does not do the actual synchronization of BSUs, but instead facilitates the synchronization process by performing inquiries and pages to establish links with client BSUs, as shown in FIG. 16. When links with clients are established, the synchronization of internal clocks (such as local clock offsets) are shared across the link. Any client BSU with which a link is established is by definition a neighbor BSU. If the synchronization manager identifies a neighbor BSU, the identify of that BSU is provided to the neighbor discovery process 1608.

Each BSU performs the synchronization process as part of a BSU synchronization profile. This profile is registered as a service with a service discovery protocol ("SDP") 1610, whenever the synchronization manager 1602 is first run (such as at power up). Upon startup of a BSU, the synchronization manager assumes the role of a sync server. However, if based on links with neighboring BSUs it determines it should switch roles and become a client, it then does so. In the sync server role, the synchronization manager 1602 initiates dedicated inquiries as it looks for neighbor BSUs. This includes defining a dedicated inquiry access code under the Bluetooth protocol. Under the Bluetooth protocol, each packet starts with an access code, and a unique dedicated inquiry access code ("DIAC") may be selected during such synchronization operation. When the server BSU receives a response from a BSU, the synchronization manager 1602 of the server BSU initiates paging to the responding BSU and sets up an ACL link, and then a connection to the synchronization managers of the client BSU.

The server synchronization manager 1602 registers the BSU of the client synchronization manager as a neighbor. This registration information is used to update a Service Availability field on a service record for BSU synchronization. The SDP 1610 contains a service record pertaining to a PNN clock synchronization status of the BSU. In addition to allowing the synchronization manager 1602 to register a service with the SDP 1610, the synchronization manager is able to set and read synchronization information in the service record. Thus, the synchronization status of the BSU on which the service record exists may be updated with a value by the synchronization manager 1602. Under this situation, the server BSU is the "master" on the link, and the client BSU is the "slave." In general, if client synchronization information received from a synchronization manager of the client BSU has a status indicated as "better" than the synchronization status of a server BSU (as reflected in the service record), then a master-slave role reversal is performed according to the Bluetooth protocol. Better may refer, for example, having a lower wave number, closer to the seed, or other indication that the synchronization is closer to the source. In this alternative embodiment, however, the client is never synchronized in the first place. It is only searching for a master because it has not synchronized yet, and thus will never have "better" synchronization.

Inter-BSU timing synchronization is accomplished by communications between peer REMon dedicated radio applications. Synchronization is periodically refreshed to correct for drift between BSUs, as explained herein.

Each baseband controller on a BSU shares a common clock frequency oscillator so that there is no frequency drift between these devices, and no periodic refresh for frequency drift is required. However, depending upon the actual implementation, refreshing inter-BSU timing that results in adjusting the REMon dedicated radio applications on a BSU may require subsequent immediate adjustments to each other baseband controller on that BSU. Every Bluetooth unit has an internal system clock that determines the timing and hopping of the transceiver radios. The Bluetooth clock is derived from a free running native clock that is generally never adjusted and never turned off. However, in the above embodiments, the native clock is directly modified. Under an alternative embodiment, for synchronization with other units, only temporary offsets are used that, added to the native clock, provide temporary Bluetooth clocks which are mutually synchronized.

For the initial Bluetooth embodiment, there is one time period of interest, namely, a 10 μsec "window of uncertainty time" within which the slot edge is deemed valid. At a maximum clock drift of 12.5 nanosec per slot, the system may drift 10 μsec over 800 slots (which takes 500 millisec). Thus, performing a resynchronization every 80 millisec is well within the 500 millisec maximum allowable interval. If a system requires greater than 64 assignable slots (such as in dense traffic areas), then REMon may be increased to provide 128 slot pairs. In this case, the resynchronization interval doubles to 160 milliseconds.

In a fully synchronized system, each base station will be listening for synchronization broadcasts from base stations acting as a sync server. Any received broadcast syncs will be combined according to a weighting process. The weighting process used may give greater or lesser weight to synchronization broadcasts based on their originating base stations' proximity to the seed. On one slot out of every 128 that a client BSU will, in turn, act as a sync server for zero or more BSUs who are at the next radial increment farther away. The weighting process used by a BSU will in one embodiment give greater weight to synchronization information coming from BSUs closer to the seed BSU, and smaller weight to BSUs farther away. This weighting process will be modifiable in software subject to "empirical tuning." Alternatively, signal processing performed may weight feedback constants, where such weights are calculated mathematically.

The "daisy-chaining" inherent in the synchronization process may result in gradually increasing synchronization differences or deltas between the seed BSU and BSUs that are geographically farther away. However, as noted herein, this is not a problem because only localized synchronization between neighbors is required (between neighboring BSUs), because handoff occurs only between neighbors.

Referring to FIG. 17A, an example of a synchronization server record 1700 is shown that effectively stores server synchronization information particular to a given BSU. That BSU's unique address is stored in a Bluetooth device address ("BD_ADDR") field 1702, which corresponds to a unique 48 bit address specified under the Bluetooth protocol. The BD_ADDR uniquely identifies each Bluetooth device universally and thus, uniquely identifies a particular BSU associated with a record.

For the Bluetooth embodiment, a piece of information communicated during synchronization is a network sync address or neighbor sync master 1704, which is the Bluetooth device address of the (virtualized) synchronization source. It is the address used by every base station during the slots in which it is acting as a sync client or sync server. Knowing the network sync address allows the base station to know the hop sequence with which sync information is being transmitted. The network sync address is used only for this sync operation.

A wave number field 1706 and a transmit slot field 1708 store a wave number during which the BSU transmits its synchronization information when it acts as a sync server, and a transmit slot when it provides such information, respectively.

Another piece of information that may be transmitted as part of "sync information" is the IP address of the system controller. Each base station needs to know this. In installations where the system controller is running a Dynamic Host Configuration Protocol ("DHCP") server, each base station employs this address to request its own IP address. Having the system controller's IP address in the "sync information" will guarantee automatic propagation of this address to all base stations in an efficient manner.

A synchronization server record may also include the BSU's IP address, which is a local IP address 1712 created where the system controller is running DHCP. This IP address may be provided to neighboring base stations during synchronization. The record may include other information (such as system data) to be shared with neighbor BSUs. Indeed any field may be provided, and include an appropriate flag to indicate that the field data is to be provided to neighbor BSUs during synchronization.

The synchronization server record 1700 may also include information regarding the record itself (which is typically not provided to neighbor BSUs), such as an initialization time field 1714 that identifies the date and time that the record was created (typically upon power up of the BSU). A resynchronization time field 1716 provides an indication as to when the synchronization process should again be performed to refresh such synchronization. This period may be system configurable. The time may be a periodic time at which synchronization is performed (e.g., every 80 milliseconds or every hour), or some other value, such as a specific day and time. The server record 1700 may also include a record expiration field 1718 that identifies when the record expires, which may be set such that the record never expires, or set to a specific time (2:00 o'clock a.m.) at which it expires and initiates synchronization again.

Referring to FIG. 17B, a neighbor list record that includes client synchronization information is shown as a record 1750. In this depicted embodiment, a separate record is stored and maintained at each BSU, where each record is associated with one neighbor BSU. (Under an alternative embodiment, a single record identifying all neighboring BSUs and their associated information may be employed.) While the server record 1700 defines how the base station provides its synchronization information to neighbors, and the information it provides, the neighbor list record includes information regarding how the base station gets its synchronization. Thus, the neighbor list record 1750 includes Bluetooth device address field 1702, the address corresponds to the neighbor from which it received its server information. The wave number field 1706 and transmit slot field 1708 define the wave and transmit slot from which it received its synchronization information. Likewise the neighbor list may also include the neighbor's IP address in field 1712 when the system controller employs DHCP.

Some Alternative Implementations

Figure 18:
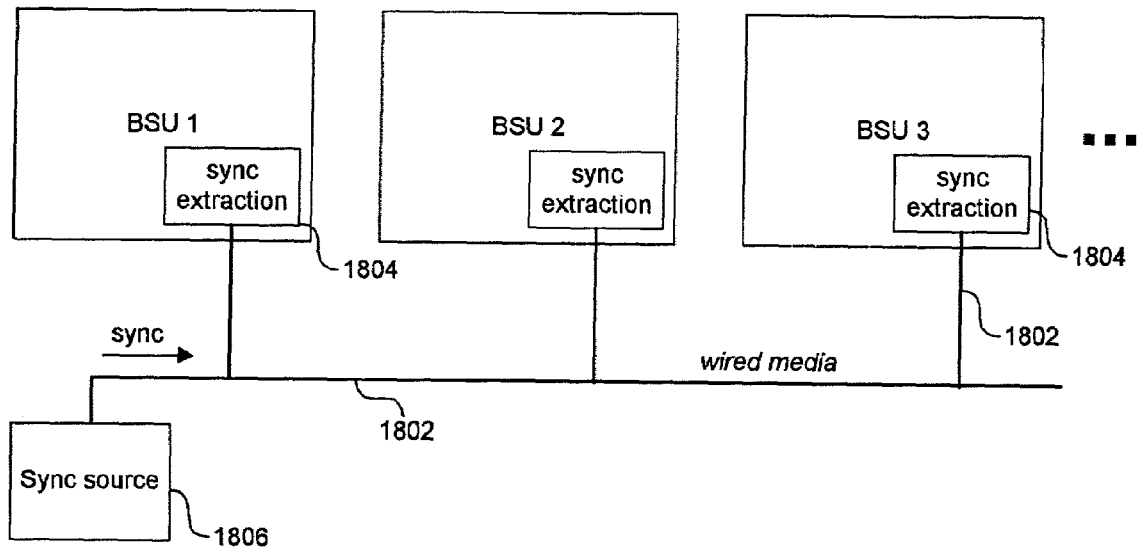
FIG. 18 is a block diagram of an alternative embodiment illustrating synchronization performed between base stations over wired media.

Under one alternative embodiment shown in FIG. 18, each BSU transmits a continuous synchronization signal over wired media 1802 (such as unused wire pairs in the PMN backend network or perhaps over the power line), instead of over the air. The synchronization signal would have a regular duty cycle, such as a square wave or sine wave. Dedicated circuitry 1804 in base stations extract the synchronization data from the signal. Dedicated source circuitry 1806 in the PMN generates the synchronization signal. A feed-forward system compensates for signal delay, which increases with the length of wire traveled by the signal.

A benefit of this approach is that it reduces complexity in the base station. A potential disadvantage of this embodiment is added circuitry cost, as well as constraints placed on how the system's backend network gets wired. For example, referring to FIG. 15, neighboring base stations B4 and B8 could not be wired such that they end up at opposite ends of a network segment, having maximum signal delay between them.

As noted above, the BSUs may receive power over a backend connection, such as an Ethernet or ISDN connection, which can also provide an independent low-frequency signal for synchronization. A master clock signal may be transmitted over an unused pair of wires in the backend connection, such as category 5 cable, from the power unit to the BSU or base band unit. The connection can employ the Network Time Protocol ("NTP"), however, NTP can only provide about one millisecond precision, which is greater than one time slot. NTP can provide gross synchronization, which in combination with other embodiments described herein, can provide sufficient time synchronization.

Alternatively, or additionally, the cabling may pass a periodic coded pattern as a master timing signal, which the base unit can synchronize to obtain better than one millisecond precision. If the BSU were to obtain full synchronization from this timing waveform, the waveform would need a period at least as long as a rollover period of a Bluetooth clock, which is a little over one day.

As a hybrid, an alternative may employ NTP to provide gross synchronization, and a shorter interval master clock for fast find synchronization. This hybrid is able to provide timing synchronization down to one microsecond or better to all connected BSUs, without any cumulative error to rippling it from unit to unit throughout the network. However, this hybrid requires some dedicated hardware at each BSU to receive and process the synchronization information. Also, this hybrid introduces a single point of failure to the network, although since it is not a complex function, the probability of a failure is low. Further, distribution cannot be used unless timing is distributed from one source, and bridges and switches would not support because they would not pass such a timing signal.

Figure 19:
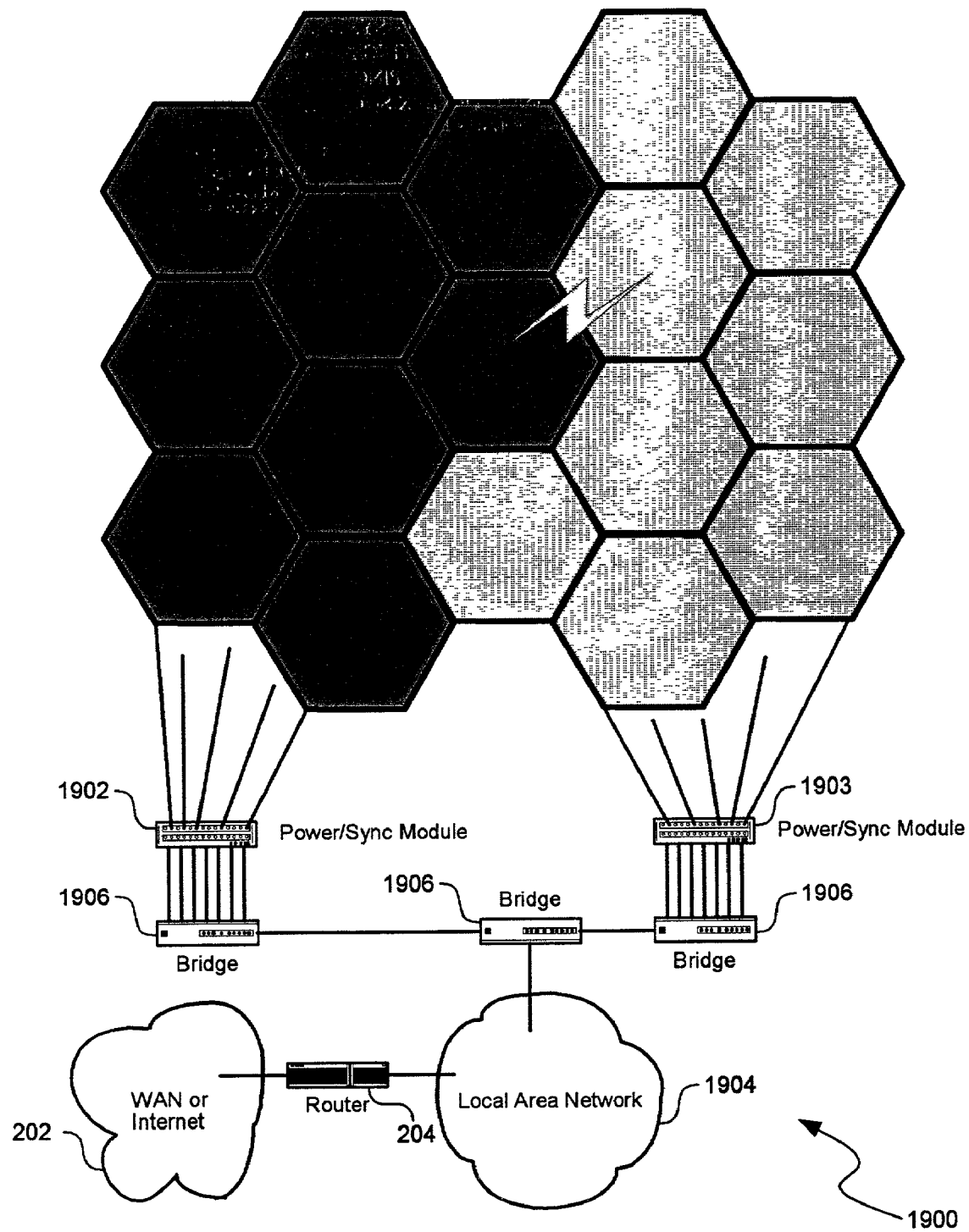
FIG. 19 is a diagram illustrating an alternative network architecture for implementing aspects of the invention.

Referring to FIG. 19, an example of a network 1900 is shown having a first subdomain handled by a first power/synchronization module 1902, and a second subdomain handled by a second power/synchronization module 1903. Several Ethernet bridges 1906 connect the two subdomains to a local area network 1904. A synchronization signal may not be passed through the bridges from one power/synchronization module to the other, and thus the two subdomains would not be synchronized. However, under one embodiment, each subdomain obtains its primary timing signal from one of its BSUs, and distributes that timing signal through the power/sync module 1902, 1903 to the bridge 1906 that defines that subdomain. Thus, each power/sync module 1902, 1903 is able to receive a sync signal from any input and distribute it to other outputs. The choice of which BSU provides the primary timing signal can be determined between the base stations, much like when choosing a router when there is more than one to select.

With each subdomain synchronized, one subdomain then acts as the sync server or source for providing timing sync to the overall network 1900, which thereby requires other subdomains to be sync clients or recipients. Sync recipient subdomains can look for and identify a neighbor relationship with the sync source subdomain, or a subdomain that has been synchronized. The sync recipient subdomain can look for and identify neighbors either wired or wirelessly. The sync recipient subdomain can then establish a timing reference with the neighbor using the synchronization word correlator output provided under the Bluetooth protocol. The synchronization word correlator can define a precise timing index. (This method is used under Bluetooth to synchronize a slave to a master within one microsecond.) The BSU in the sync recipient subdomain can then execute a takeover of its own subdomain, and become the primary reference for that subdomain to resynchronize that subdomain based on the neighboring subdomain from which it received its synchronization.

An advantage of this system is that any errors that may accumulate in a wireless synchronization approach are limited to only subdomains. Advantages of a backend network synchronization is maintained over each subdomain, but there is corresponding increasing complexity, and possibly decreasing reliability.

All wireless synchronization embodiments described above may employ the synchronization word correlator output described above. Alternatively, or additionally, such wireless approaches may exchange frequency hopping synchronization ("FSH") information on a periodic basis to synchronize clocks, which would share timing to one-half a slot time interval, or about 313 microseconds. As with the synchronization word correlator, employing FSH allows the system to use existing Bluetooth base band controller functions. Of course, BSUs may communicate more precise clock timing by direct communication over the air using a proprietary clock, not part of the Bluetooth protocol.

Under another alternative embodiment, instead of utilizing direct base station-to-base station RF resources to communicate and synchronize, a pair of base stations could utilize one or more "common" MUs that they can both "hear." One base station, the "owner," controls the MU but has asked the other base station to monitor the MU's link quality in case a handoff proves necessary. When one BSU communicates with another, or are both communicating with a BSU, their slots are necessarily aligned, and thus they are synchronized. The owner may then synchronize to transmit slots received from the MU, and thereafter sync with neighbors.

Under the Bluetooth standard, only one base station can be the owner (assuming the system does not use scatternets). By virtue of the owner-slave relationship, the owner base station and MU have their slots aligned. The other base station, which does not have a Bluetooth link with the MU but which is monitoring the MU signal strength, gets slot edge alignment information indirectly via its monitoring activity. A drawback to this embodiment is its reliance on the presence of such MUs in the coverage overlap zones between base stations. If there do not happen to be any such MUs, then synchronization does not occur. Another drawback with this approach is reduced accuracy since both base stations are synchronizing to a third party, the MU, instead of to each other. The MU's own error adds directly to the synchronization delta. Overall synchronization stability could be reduced.

Figure 20:
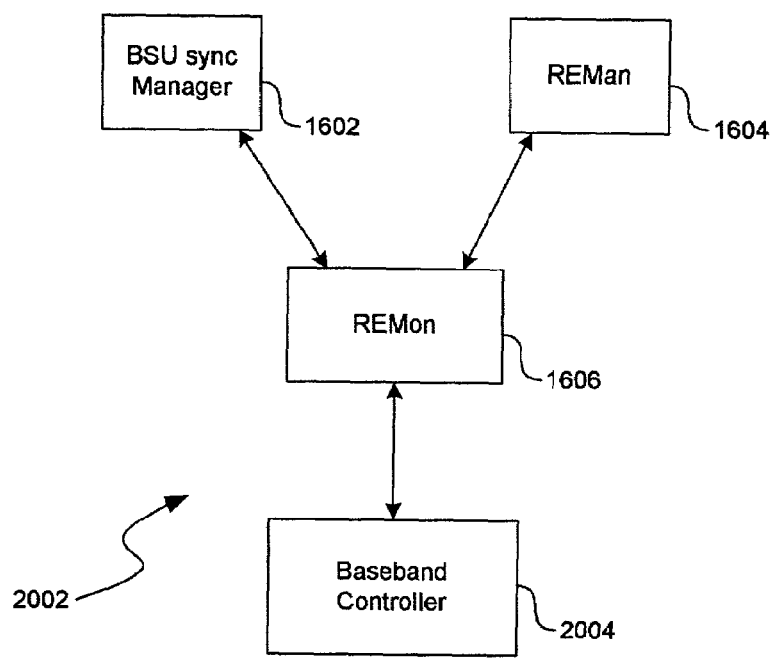
FIG. 20 is a block diagram illustrating an alternative software component architecture.

Referring to FIG. 20, an alternative embodiment to the software architecture described above is shown. In this alternative embodiment 2002, REMan 1604 and REMon 1606 behave as previously described, except that REMon can receive requests from two sources, and it has another schedule for synchronization transmissions. The synchronization manager 1602 can place a request to listen with REMon 1606 (which in turn communicates with a base band controller 2004), which is the same request to listen placed by REMan 1604, but the sync manager is initiated with a periodic event timer. A performance metric that the sync manager requests from REMon is a measure of sync offset between this BSU and the one it is listening to.

The sync manager 1602 can periodically request REMon 1606 to generate a sync transmission. A peer sync manager on a listening BSU must coordinate listening for such a sync transmission, so the protocol must provide for simultaneous arrangement of transmitting of sync messages by sync servers, and listening for such messages by sync clients, as described herein, or at specific, universally recognized times. The sync manager 1602 coordinates synchronizing of all BTSs, which may be done separately from REMan 1604. Thus, the sync manager has communications with the BTSs, and may have at least some control over time references used on each BTS.

REMon 606 can share indirect synchronization information with the sync manager 1602, even while it is monitoring an MU of another owner BSU. The MU is synchronized to the owner BSU, so when REMon of a neighbor BSU is monitoring that MU, that REMon can derive synchronization from the mobile unit, as noted herein. The sync manager of the neighbor thus gets an update on that neighbor, which can reset a timer in the sync manager so that sync transmissions can be delayed or postponed if this neighbor BSU is synchronized with the BSU currently communicating with the MU. Such a reset of the timer may save on wireless band width.

As will be evident from the detailed description provided herein, aspects of the invention minimize the number of packets that must be retransmitted when channel collisions occur. Channel collisions are largely unavoidable, and they normally invalidate data in the overlapping portions of both colliding transmission slots in an unaligned system. By synchronizing base stations such that any colliding transmission slots are fully overlaid, the system reduces the impact of channel collisions to a single slot of data.

Aspects of the invention also provide for slot reassignment to efficiently perform synchronization or other tasks where a BSU acts both as a client and as a server. Aspects of the invention allocate slot patterns to radios controlled by the BSU to permit most efficient resource allocation.

Further, aspects of the invention improve base station-to-base station handoff. A base station monitors the wireless link quality of MUs on behalf of other base stations. For an MU that an owner base station wants a neighbor base station to monitor for RF link quality, embodiments of this invention enable the neighbor base station to very quickly listen for the MU since the receive slot time is known. Only when both base station slot edges are aligned can the neighbor immediately listen without first having to account for slot edge misalignment.

Skipped slots become unnecessary when an MU leaving one base station is handed off to a new base station. Data to the MU does not have to wait for the next slot "leading edge" to arrive at the new base station; the new base station's next slot begins precisely where the previous base station's slot ended.

Handoff setup becomes faster since there is no need to send slot edge information from old to new base stations, because as they are already aligned. There is less setup data to calculate and transmit.

While base station units are generally described herein, aspects of the invention may employ any "Bluetooth switch." Such a switch may have less functionality and be cheaper to implement than a base station unit. Aspects of the invention apply to nodes in a network, such as network access points, stationary nodes in an picocellular communications network, peer-to-peer stationary network access points, and the like.

Those skilled in the relevant art will appreciate that the invention can be practiced with various telecommunications or computer system configurations, including Internet appliances, hand-held devices, wearable computers, palm-top computers, cellular or mobile phones, multi-processor systems, microprocessor-based or programmable consumer electronics, set-top boxes, network PCs, mini-computers, mainframe computers, and the like. Aspects of the invention can be embodied in a special purpose computer or data processor that is specifically programmed, configured, or constructed to perform one or more of the computer-executable instructions explained in detail herein. Indeed, the term "computer", as used generally herein, refers to any of the above devices, as well as to any data processor. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Incorporated by reference herein are all above references, patents, or applications and the following U.S. applications, which are assigned to the assignee of this application: application Ser. No. 10/052,910, entitled "Link Context Mobility, Such as for use in Wireless Networks", filed Jan. 18, 2002; Application No. 60/288,296, filed May 2, 2001, now PCT Application No. US02/13880, filed May 2, 2002, entitled "Wireless Base Neighbor Discovery in a Communication System, Such as a System Employing a Short-Range Frequency Hopping Scheme"; Application No. 60/288,270, filed May 2, 2001, now PCT Application No. US02/1 3710, filed May 2, 2002, entitled "Connection Initiation in Wireless Networks Including Load Balancing"; Application No. 60/288,301, filed May 2, 2001, now PCT Application No. US02/13879, filed May 2, 2002, entitled "Reducing Mutual Channel Interference in Frequency-Hopping Spread Spectrum Wireless Communication Systems, Such as Bluetooth Systems"; Application No. 60/288,300, filed May 2, 2001, now PCT Application No. US02/13889, filed May 2, 2002, entitled "Method and System for Indicating Link Quality Among Neighboring Wireless Base Stations"; and Application No. 60/311716, entitled "Virtual Bluetooth Devices as a Means of Extending Pairing and Bonding in a Bluetooth Network". Aspects of the invention can be modified, if necessary, to employ the systems, functions and concepts of the various patents and applications described above to provide yet further embodiments of the invention.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above", "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the PMN system described herein. The various embodiments described herein can be combined to provide further embodiments. These and other changes can be made to the invention in light of the detailed description.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A system for wirelessly exchanging communications with at least one mobile unit, the system comprising:

more than two base station units coupled to a network, wherein each base station unit includes an internal clock, and a processor and at least one radio configured to communicate wirelessly with the mobile unit under a Bluetooth protocol, wherein the Bluetooth protocol is a short-range, frequency hopping protocol for transmitting and receiving information during time division duplex pairs of transmit and receive slots;

wherein each base station unit is further configured to:
 (a) enter into a synchronization mode,
 (b) receive a sync signal from a neighboring base station unit,
 (c) determine if the neighboring base station unit is synchronized based on the received sync signal,
 (d) if the neighboring base station unit is synchronized, then synchronize the internal clock based on the received sync signal, wherein the synchronizing is performed without assistance from a system controller,
 (e) select one transmit slot from the pairs of slots, (f) lock the other base station units from transmitting on the one selected transmit slot, (g) wirelessly transmit synchronization information during the one selected transmit slot, (h) permit the other base station units to unlock, and (i) exit the synchronization mode.

2. The system of claim 1 wherein the locking of the other base station units includes sending a lock request message to at least some of the other base station units and receiving therefrom a lock granted message; and wherein the pairs of transmit and receive slots repeat over a cycle of n pairs of slots, wherein each base station unit selects a lowest available slot, and wherein each base station unit includes:

upper and lower Bluetooth protocol stacks, a radio environment management component to evaluate quality of links with mobile units and assist in handing off mobile units to a neighboring base station unit, wherein the radio environment management component is configured to operate above a Host Controller Interface ("HCI") under the Bluetooth protocol, a radio environment monitoring component, configured to operate below the HCI, for monitoring the links with mobile units, wherein the lower layers operate below the HCI; and wherein the radio environment management and monitoring components are configured to, at least in part, facilitate receiving the sync signal, selecting the one transmit slot and wirelessly transmitting synchronization information.

3. The system of claim 1 wherein the received sync signal including information regarding the neighboring base station unit and a wave number during which the sync signal was transmitted, and wherein each base station unit is further configured to:

store locally the information regarding the neighboring base station unit, including the wave number and information identifying the neighboring base station unit, as sync client data; and store locally information regarding the selected one transmit slot, a new wave number, and identification information, as sync server data.

4. In a network for wirelessly exchanging communications with mobile units, wherein the network includes first and second base stations units coupled to the network, and a system controller coupled to the network, a method comprising:

at the first base station unit, receiving a communications signal from the second base station unit, wherein the first and second base station units are configured to employ a wireless communications protocol, and wherein the wireless communications protocol does not provide for handoff of communications links between base station units;

at the first base station unit, determining if the second base station unit has been synchronized based on the communications signal; and at the first base station unit, if the second base station unit is synchronized, then synchronizing an internal clock based on the synchronized second base station, wherein the synchronizing is performed without assistance from the system controller or mobile units;

wherein base station units in the network are synchronized in waves based on an initial communications signal from an initial seed base station unit.

5. The method of claim 4 wherein the wireless communications protocol is a Bluetooth protocol.

6. The method of claim 4 wherein the communications signal is a wireless communication signal.

7. The method of claim 4, further comprising, at the first base station unit, storing information regarding the second base station unit, including an indication of a wave during which the second base station unit transmitted the communications signal, and information identifying the second base station unit.

8. The method of claim 4, further comprising, at the first base station unit, storing information regarding the first base station unit, including an indication of a wave during which the first base station unit transmitted a related communications signal, and information identifying the first base station unit.

9. The method of claim 4, further comprising selecting an initial seed base station unit by transmitting, from a system controller, a query signal, and designating an initial base station unit to respond as the seed base station unit.

10. The method of claim 4, further comprising selecting an initial seed base station unit by transmitting between the first and second base station units initial messages to select the seed base station unit.

11. The method of claim 4 wherein the second base station unit transmits the communications signal at a power level greater than a power level for exchanging communications with the mobile unit.

12. The method of claim 4, further comprising, at the first base station unit, selecting a slot under the wireless communications protocol for transmitting synchronization information to neighboring base station units, wherein the selected slot is unique among first and second sets of base station units, wherein the first set of base station units includes neighbors of the first base station unit and the second set includes neighbors to the first set.

13. The method of claim 4, further comprising synchronizing the internal clock periodically, approximately once every 80 milliseconds.

14. The method of claim 4, further comprising, at the first base station unit, receiving a similar communications signal from a third base station unit, and weighting the communications signals from the second and third base station units based on a proximity of the second and third base station units to an initial base station unit that initiated synchronization.

15. The method of claim 4 wherein the first base station unit receives the communications signal wirelessly from the second base station unit.

16. The method of claim 4 wherein the first base station unit receives the communications signal wirelessly from the second base station unit over a wired back-end network coupled between the first and second base station units.

17. The method of claim 4 wherein synchronizing the internal clock includes modifying the internal clock.

18. The method of claim 4 wherein synchronizing the internal clock includes modifying offsets to the internal clock.

19. In a network for wirelessly exchanging communications with mobile units, wherein the network includes first and second base stations units coupled to the network, and a system controller coupled to the network, a method comprising:

at the first base station unit, receiving a communications signal from the second base station unit, wherein the first and second base station units are configured to employ a wireless communications protocol, and wherein the wireless communications protocol does not provide for handoff of communications links between base station units;

at the first base station unit, determining if the second base station unit has been synchronized based on the communications signal; and at the first base station unit, if the second base station unit is synchronized, then synchronizing an internal clock based on the synchronized second base station, wherein the synchronizing is performed without assistance from the system controller or mobile units; and at the first base station unit, if the second base station unit is not synchronized, then waiting until a new communications signal from another base station unit in the network that is synchronized.

20. The method of claim 19, further comprising, at the first base station unit, storing information regarding either (1) the second base station unit, including an indication of a wave during which the second base station unit transmitted the communications signal, and information identifying the second base station unit, or (2) the first base station unit, including an indication of a wave during which the first base station unit transmitted a related communications signal, and information identifying the first base station unit.

21. The method of claim 19, further comprising selecting an initial seed base station unit (1) under a random process, (2) by transmitting, from a system controller, a query signal, and designating an initial base station unit to respond as the seed base station unit, or (3) by transmitting between the first and second base station units initial messages to select the seed base station unit.

22. In a network for wirelessly exchanging communications with mobile units, wherein the network includes first and second base stations units coupled to the network, and a system controller coupled to the network, a method comprising:

at the first base station unit, receiving a communications signal from the second base station unit, wherein the first and second base station units are configured to employ a wireless communications protocol, and wherein the wireless communications protocol does not provide for handoff of communications links between base station units;

at the first base station unit, determining if the second base station unit has been synchronized based on the communications signal; and at the first base station unit, if the second base station unit is synchronized, then synchronizing an internal clock based on the synchronized second base station, wherein the synchronizing is performed without assistance from the system controller or mobile units, and sending a lock request message to the second base station unit, and receiving therefrom a lock granted message.

23. In a network for wirelessly exchanging communications with mobile units, wherein the network includes first and second base stations units coupled to the network, and a system controller coupled to the network, a method comprising:

at the first base station unit, receiving a communications signal from the second base station unit, wherein the first and second base station units are configured to employ a wireless communications protocol, and wherein the wireless communications protocol does not provide for handoff of communications links between base station units;

at the first base station unit, determining if the second base station unit has been synchronized based on the communications signal; and at the first base station unit, if the second base station unit is synchronized, then synchronizing an internal clock based on the synchronized second base station, wherein the synchronizing is performed without assistance from system controller or mobile units, and selecting an initial seed base station unit (1) under a random process, (2) by transmitting, from a system controller, a query signal, and designating an initial base station unit to respond as the seed base station unit, or (3) by transmitting between the first and second base station units initial messages to select the seed base station unit.

24. The method of claim 23 wherein the second base station unit transmits the communications signal at a power level greater than a power level for exchanging communications with the mobile unit.

25. The method of claim 23, further comprising, at the first base station unit, selecting a slot under the wireless communications protocol for transmitting synchronization information to neighboring base station units, wherein the selected slot is unique among first and second sets of base station units, wherein the first set of base station units includes neighbors of the first base station unit and the second set includes neighbors to the first set.

26. In a network for wirelessly exchanging communications with mobile units, wherein the network includes first and second base stations units coupled to the network, and a system controller coupled to the network, a method comprising:

at the first base station unit, receiving a communications signal from the second base station unit, wherein the first and second base station units are configured to employ a wireless communications protocol, and wherein the wireless communications protocol does not provide for handoff of communications links between base station units;

at the first base station unit, determining if the second base station unit has been synchronized based on the communications signal; and at the first base station unit, if the second base station unit is synchronized, then synchronizing an internal clock based on the synchronized second base station, wherein the synchronizing is performed without assistance from system controller or mobile units;

wherein at the first base station unit, receiving a similar communications signal from a third base station unit, and applying differing weight factors to the communications signals from the second and third base station units.

27. The method of claim 26 wherein the first base station unit receives the communications signal from the second base station unit over a wired back-end network coupled between the first and second base station units.

28. The method of claim 26 wherein synchronizing the internal clock includes modifying the internal clockmodifying offsets to the internal clock.

29. In a network for wirelessly exchanging communications with at least one mobile unit, wherein the network includes multiple network access points coupled to the network, a method performed by at least some network access points comprising:

receiving a sync signal from a neighboring network access point;

locking at least neighboring network access points from synchronizing;

choosing a transmission slot under a slotted communications protocol;

recording synchronization information, and unlocking the neighboring network access points.

30. The method of claim 29 wherein the slotted communications protocol is a Bluetooth protocol.

31. The method of claim 29 wherein receiving a sync signal from a neighboring network access point includes wirelessly receiving the sync signal from the neighboring network access point.

32. The method of claim 29 wherein recording synchronization information includes recording locally a synchronization wave number.

33. The method of claim 29 wherein recording synchronization information includes storing locally at a network access point information regarding how the network access point achieves synchronization based the sync signal received from the neighboring network access point.

34. The method of claim 29 wherein recording synchronization information includes storing locally at a network access point information regarding how the network access point provides synchronization to neighboring network access points.

35. The method of claim 29, further comprising synchronizing an internal clock periodically based on the received sync signal.

36. The method of claim 29, further comprising, receiving a similar sync signal from another neighboring network access point, and applying differing weight factors to the sync signals from the neighboring network access points.

37. The method of claim 29 wherein receiving the sync signal includes receiving from the neighboring network access point the sync signal over a wired back-end network.

38. The method of claim 29 wherein locking at least neighboring network access points includes:

sending a lock request message to neighboring network access points, and receiving from neighboring network access points a lock granted message, wherein the lock granted message includes data regarding previously selected transmission slots.

39. The method of claim 29 wherein recording synchronization information includes receiving from neighboring network access points, and storing locally, data regarding previously selected transmission slots.

40. In a picocellular communications network, wherein at least one mobile unit communicates with at least a portion of the network, an apparatus comprising:

a wireless network access point coupled to the picocellular communications network, wherein the network access point includes:

a memory, at least one radio for transmitting and receiving data on respective transmit and receive slots, and a processor coupled to the memory and the radio, wherein the network access point is configured for:

receiving a communications signal from a nearby network access point, wherein the radio and processor are configured to employ a slotted wireless communications protocol, and wherein the wireless communications protocol does not provide for handoff of communications links between network access points;

determining if the nearby network access point has been synchronized based on the communications signal; and if the nearby network access point is synchronized, then synchronizing the transmit and receive slots based on the synchronized nearby network access point, wherein the synchronizing is performed without assistance from a system controller or mobile units;

wherein the memory includes:

a lower Bluetooth protocol stack, a radio environment monitoring component for monitoring links with mobile units, configured to operate below a Host Controller Interface ("HCI") under a Bluetooth protocol;

a radio environment management component to evaluate quality of links with mobile units and assist in handing off mobile units to a neighboring base station unit, wherein the radio environment management component is configured to operate above the HCI, and wherein the radio environment management and monitoring components are configured to, at least in part, facilitate synchronizing the transmit and receive slots.

41. The apparatus of claim 40, further comprising:

a system controller coupled to the network access point;

a gateway router coupled to the system controller and the network access point, wherein the network access point forms at least a part of a first subnet;

a backbone router coupled to the gateway router and to the neighboring network access point, wherein the neighboring network access point forms at least a part of a second subnet; and a point of presence coupled to the backbone router, wherein the point of presence and the mobile unit form at least part of a mobile unit virtual subnet.

42. The apparatus of claim 40 wherein the wireless protocol is a Bluetooth protocol.

43. The apparatus of claim 40 wherein the network access point includes:

an internal clock; and a synchronization manager that facilitates synchronization processes by performing an inquiry and page to establish communications links with the nearby network access point, and when the link is established, then synchronizing local clock offsets from the internal clock and those of the nearby network access point across the link.

44. The apparatus of claim 40 wherein the network access point includes:

a service discovery protocol ("SDP");

a synchronization manager that facilitates synchronization processes; and a synchronization profile registered with the SDP, wherein the profile instructs the synchronization manager to initially attempt to wirelessly synchronize nearby network access points by employing a dedicated inquiry access code under a Bluetooth protocol.

45. The apparatus of claim 40 wherein the network access point includes:

a native clock, wherein synchronizing the transmit and receive slots includes modifying the native clock.

46. The apparatus of claim 40 wherein the network access point includes:

a native clock, wherein synchronizing the transmit and receive slots includes modifying offsets to the native clock.

47. The apparatus of claim 40 wherein the network access point is stationary relative to a vehicle.

48. The apparatus of claim 40 wherein the memory includes:
   a radio environment monitoring component for monitoring links with mobile units;
   a radio environment management component to provide monitoring requests to the monitoring component and to evaluate quality of links with mobile units, and
   a periodically initiated synchronizing manager to provide monitoring requests to the monitoring component and to facilitate synchronization processes.

49. In a picocellular communications network, wherein at least one mobile unit communicates with at least a portion of the network, an apparatus comprising:
   a wireless network access point coupled to the picocellular communications network, wherein the network access point includes:
      a memory,
      at least one radio for transmitting and receiving data on respective transmit and receive slots, and
      a processor coupled to the memory and the radio,
   wherein the network access point is configured for:
      receiving a communications signal from a nearby network access point, wherein the radio and processor are configured to employ a slotted wireless communications protocol, and wherein the wireless communications protocol does not provide for handoff of communications links between network access points;
      determining if the nearby network access point has been synchronized based on the communications signal; and
      if the nearby network access point is synchronized, then synchronizing the transmit and receive slots based on the synchronized nearby network access point, wherein the synchronizing is performed without assistance from a system controller or mobile units
   a lower Bluetooth protocol stack,
   a radio environment monitoring component for monitoring links with mobile units, configured to operate below a Host Controller Interface ("HCI") under a Bluetooth protocol;
   wherein the radio environment monitoring component communicates wirelessly with a peer radio environment monitoring component of the nearby network access point to synchronize the transmit and receive slots.

50. The apparatus of claim 49 wherein the wireless protocol is a Bluetooth protocol.

51. The apparatus of claim 49 wherein the network access point includes:
   an internal clock; and
   a synchronization manager that facilitates synchronization processes by performing an inquiry and page to establish communications links with the nearby network access point, and when the link is established, then synchronizing local clock offsets from the internal clock and those of the nearby network access point across the link.

52. In a picocellular communications network, wherein at least one mobile unit communicates with at least a portion of the network, an apparatus comprising:
   a wireless network access point coupled to the picocellular communications network, wherein the network access point includes:
      a memory,
      at least one radio for transmitting and receiving data on respective transmit and receive slots, and
      a processor coupled to the memory and the radio,
   wherein the network access point is configured for:
      receiving a communications signal from a nearby network access point, wherein the radio and processor are configured to employ a slotted wireless communications protocol, and wherein the wireless communications protocol does not provide for handoff of communications links between network access points;
      determining if the nearby network access point has been synchronized based on the communications signal; and
      if the nearby network access point is synchronized, then synchronizing the transmit and receive slots based on the synchronized nearby network access point, wherein the synchronizing is performed without assistance from a system controller or mobile units,
   wherein the memory includes:
      a radio environment monitoring component for monitoring a link with a mobile unit, wherein the mobile unit is communicating wirelessly with the nearby network access point, and
      a synchronization manager that receives data from the monitoring component regarding a synchronization status of the nearby network access point from the monitored link, and wherein the synchronization manager may postpone a resynchronization process if the wireless network access point is determined to be synchronized to the nearby network access point based on the synchronization status.

53. The apparatus of claim 52 wherein the network access point includes:
   a native clock, wherein synchronizing the transmit and receive slots includes modifying the the native clock or offsets to the native clock.

54. The apparatus of claim 52 wherein the network access point is stationary relative to a vehicle.

* * * * *